United States Patent
Zavodny et al.

(10) Patent No.: US 9,424,672 B2
(45) Date of Patent: Aug. 23, 2016

(54) METHOD AND APPARATUS FOR PROCESSING AND ALIGNING DATA POINT CLOUDS

(71) Applicant: HERE Global B.V., Veldhoven (NL)

(72) Inventors: Alexandri Gregor Zavodny, Chicago, IL (US); Xin Chen, Evanston, IL (US)

(73) Assignee: HERE Global B.V., Veldhoven (NL)

( * ) Notice: Subject to any disclaimer, the term of this patent is extended or adjusted under 35 U.S.C. 154(b) by 139 days.

(21) Appl. No.: 14/074,384

(22) Filed: Nov. 7, 2013

(65) Prior Publication Data

US 2015/0123995 A1    May 7, 2015

(51) Int. Cl.
G06T 11/60 (2006.01)
G06T 7/00 (2006.01)

(52) U.S. Cl.
CPC ............. G06T 11/60 (2013.01); G06T 7/0024 (2013.01); G06T 2207/10028 (2013.01); G06T 2207/30184 (2013.01)

(58) Field of Classification Search
None
See application file for complete search history.

(56) References Cited

U.S. PATENT DOCUMENTS

| | | | |
|---|---|---|---|
| 7,003,136 B1 * | 2/2006 | Harville | 382/103 |
| 8,284,190 B2 | 10/2012 | Muktinutalapati et al. | |
| 8,825,260 B1 * | 9/2014 | Silver et al. | 701/23 |
| 2008/0310757 A1 | 12/2008 | Wolberg et al. | |
| 2010/0217529 A1 * | 8/2010 | Stroila et al. | 702/5 |
| 2010/0321490 A1 * | 12/2010 | Chen et al. | 348/118 |
| 2012/0041722 A1 * | 2/2012 | Quan et al. | 703/1 |
| 2013/0013185 A1 * | 1/2013 | Smitherman et al. | 701/409 |
| 2015/0116691 A1 * | 4/2015 | Likholyot | 356/4.01 |

OTHER PUBLICATIONS

Zavodny, Alexandri Gregor. Analysis of large-scale unstructured urban range scan data. Diss. University of Notre Dame, 2009.*
Streutker et al. ("A slope-based method for matching elevation surfaces." Photogrammetric Engineering & Remote Sensing 77.7 (2011): 743-750.).*
Xie, Zexiao, Shang Xu, and Xuyong Li. "A high-accuracy method for fine registration of overlapping point clouds." Image and Vision Computing 28.4 (2010): 563-570.*
L. Zhu et al., "Photorealistic Building Reconstruction from Mobile Laser Scanning Data", Remote Sensing Jul. 6, 2011, pp. 1406-1426.

(Continued)

*Primary Examiner* — Xiao Wu
*Assistant Examiner* — Yu Chen
(74) *Attorney, Agent, or Firm* — Ditthavong & Steiner, P.C.

(57) ABSTRACT

An approach is provided to efficiently and accurately process and align of one or more portions of a plurality of data point clouds. A processing platform may cause a segmentation of at least one first geo-registered point cloud and at least one second geo-registered point cloud based, at least in part, on an application of a ground surface threshold to one or more respective points in the at least one first geo-registered point cloud and the at least one second geo-registered point cloud. The processing platform may further cause a processing and/or facilitating a processing of the one or more respective points that are above the ground surface threshold to determine a horizontal offset for a horizontal alignment of the at least one first geo-registered point cloud and the at least one second geo-registered point cloud. The processing platform may also cause a processing and/or facilitating a processing of the one or more respective points that are below the ground surface threshold to determine a vertical offset for a vertical alignment of the at least one first geo-registered point cloud and the at least one second geo-registered point cloud.

14 Claims, 18 Drawing Sheets

(56) References Cited

OTHER PUBLICATIONS

A. Gressin et al., "Towards 3D lidar point cloud registration improvement using optimal neighborhood knowledge", ISPRS Journal of Photogrammetry and Remote Sensing, Feb. 28, 2013, pp. 240-251.

M. Ying Yang et al., "Fusion of camera images and laser scans for wide baseline 3D scene alignment in urban environments", ISPRS Journal of Photogrammetry and Remote Sensing, 2011.

J. Rosell et al. "Obtaining the three-dimensional structure of tree orchards from remote 2D terrestrial LIDAR scanning". Agricultural and Forest Meteorology, Apr. 19, 2009, pp. 1505-1515.

M.A. Fischler et al. Random sample consensus: "A paradigm for model fitting with applications to image analysis and automated cartography", Communications of the ACM, 24(6), 1981, pp. 381-395.

P. Besl et al., "A method for registration of 3-d shapes", In IEEE Transactions on Pattern Analysis and Machine Intelligence, vol. 14, 1992, pp. 239-256.

\* cited by examiner

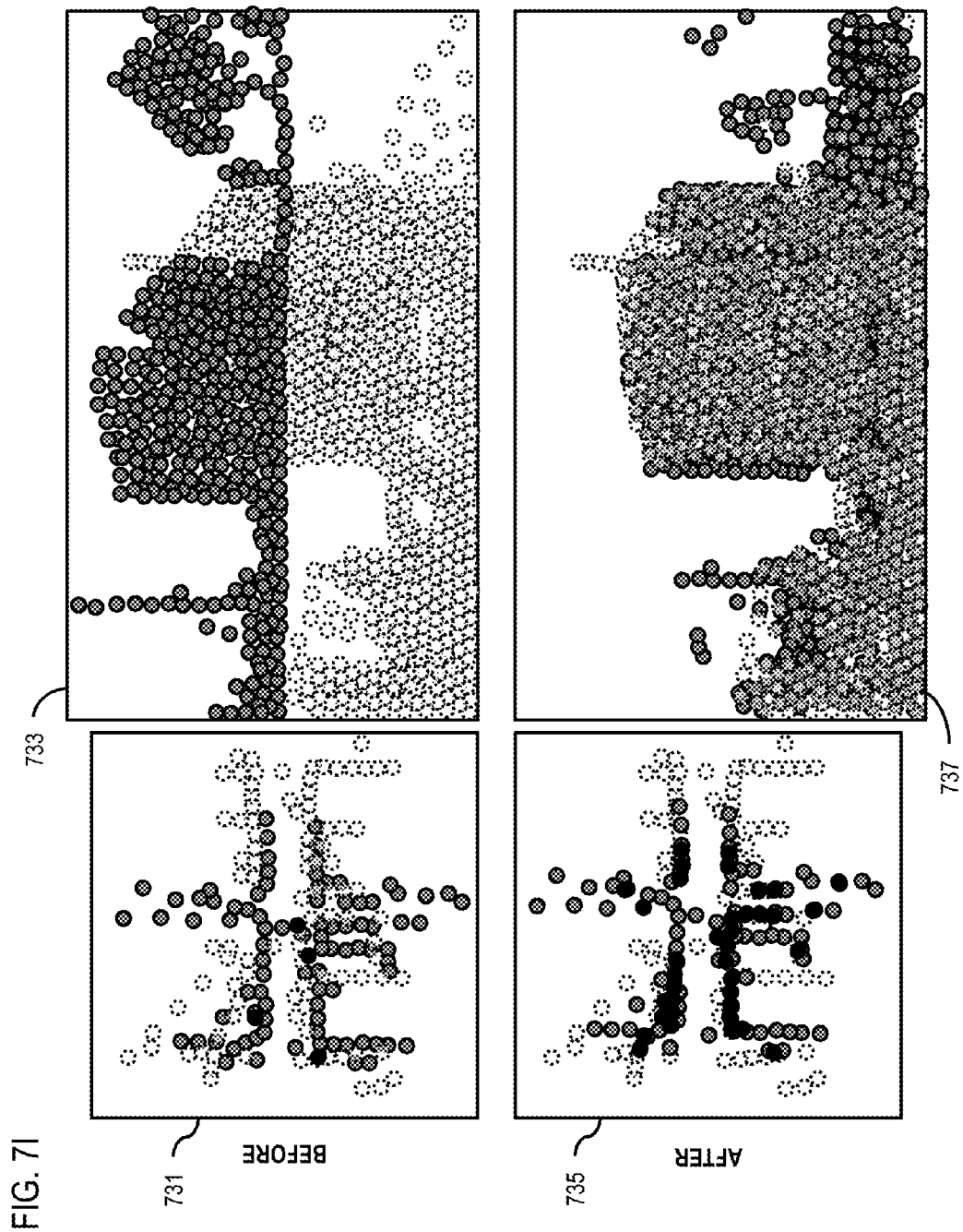

METHOD AND APPARATUS FOR PROCESSING AND ALIGNING DATA POINT CLOUDS

BACKGROUND

Service providers and device manufacturers (e.g., wireless, cellular, etc.) are continually challenged to deliver value and convenience to consumers by, for example, providing compelling network services. One area of interest has been providing map information (e.g., via mobile phone, tablets, in-vehicle systems, etc.) associated with different locations and points of interest (POIs) that users may be interested in. For example, a digital map on a smart phone may illustrate a view of roads, buildings, bridges, terrain, etc. The data necessary for providing the map and location services may be obtained from collecting and processing large volumes of geographical location information associated with different POIs, and the data may be acquired by various mechanisms (e.g., imaging data, positioning data, light detection and ranging (LIDAR), etc.), various devices (e.g., cameras, global positioning system (GPS) receivers, LIDAR scanners, etc.), various contributors, and at various times. However, since the data may be collected at different times and by using different mechanisms, the data should be processed for determining any potential errors in order to provide useful and accurate data for use in the maps, navigation systems, and the like. Accordingly, service providers and device manufacturers face significant technical challenges in collecting and processing the geographical location information.

SOME EXAMPLE EMBODIMENTS

Therefore, there is a need for an approach to efficiently and accurately process and align one or more portions of a plurality of data point clouds.

According to one embodiment, a method comprises causing, at least in part, a segmentation of at least one first geo-registered point cloud and at least one second geo-registered point cloud based, at least in part, on an application of a ground surface threshold to one or more respective points in the at least one first geo-registered point cloud and the at least one second geo-registered point cloud. The method also comprises processing and/or facilitating a processing of the one or more respective points that are above the ground surface threshold to determine a horizontal offset for a horizontal alignment of the at least one first geo-registered point cloud and the at least one second geo-registered point cloud. The method further comprises processing and/or facilitating a processing of the one or more respective points that are below the ground surface threshold to determine a vertical offset for a vertical alignment of the at least one first geo-registered point cloud and the at least one second geo-registered point cloud.

According to another embodiment, an apparatus comprises at least one processor, and at least one memory including computer program code for one or more computer programs, the at least one memory and the computer program code configured to, with the at least one processor, cause, at least in part, a segmentation of at least one first geo-registered point cloud and at least one second geo-registered point cloud based, at least in part, on an application of a ground surface threshold to one or more respective points in the at least one first geo-registered point cloud and the at least one second geo-registered point cloud. The apparatus is also caused to process and/or facilitate a processing of the one or more respective points that are above the ground surface threshold to determine a horizontal offset for a horizontal alignment of the at least one first geo-registered point cloud and the at least one second geo-registered point cloud. The apparatus is further caused to process and/or facilitate a processing of the one or more respective points that are below the ground surface threshold to determine a vertical offset for a vertical alignment of the at least one first geo-registered point cloud and the at least one second geo-registered point cloud.

According to another embodiment, a computer-readable storage medium carries one or more sequences of one or more instructions which, when executed by one or more processors, cause, at least in part, a segmentation of at least one first geo-registered point cloud and at least one second geo-registered point cloud based, at least in part, on an application of a ground surface threshold to one or more respective points in the at least one first geo-registered point cloud and the at least one second geo-registered point cloud. The apparatus is also caused to process and/or facilitate a processing of the one or more respective points that are above the ground surface threshold to determine a horizontal offset for a horizontal alignment of the at least one first geo-registered point cloud and the at least one second geo-registered point cloud. The apparatus is further caused to process and/or facilitate a processing of the one or more respective points that are below the ground surface threshold to determine a vertical offset for a vertical alignment of the at least one first geo-registered point cloud and the at least one second geo-registered point cloud.

According to another embodiment, an apparatus comprises means for causing, at least in part, a segmentation of at least one first geo-registered point cloud and at least one second geo-registered point cloud based, at least in part, on an application of a ground surface threshold to one or more respective points in the at least one first geo-registered point cloud and the at least one second geo-registered point cloud. The apparatus also comprises means for processing and/or facilitating a processing of the one or more respective points that are above the ground surface threshold to determine a horizontal offset for a horizontal alignment of the at least one first geo-registered point cloud and the at least one second geo-registered point cloud. The apparatus further comprises means for processing and/or facilitating a processing of the one or more respective points that are below the ground surface threshold to determine a vertical offset for a vertical alignment of the at least one first geo-registered point cloud and the at least one second geo-registered point cloud.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A through 7I illustrate various depictions of aligning one or more portions of two data point clouds, according to various embodiments;

DESCRIPTION OF SOME EMBODIMENTS

Examples of a method, apparatus, and computer program to efficiently and accurately process and align one or more portions of a plurality of data point clouds are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
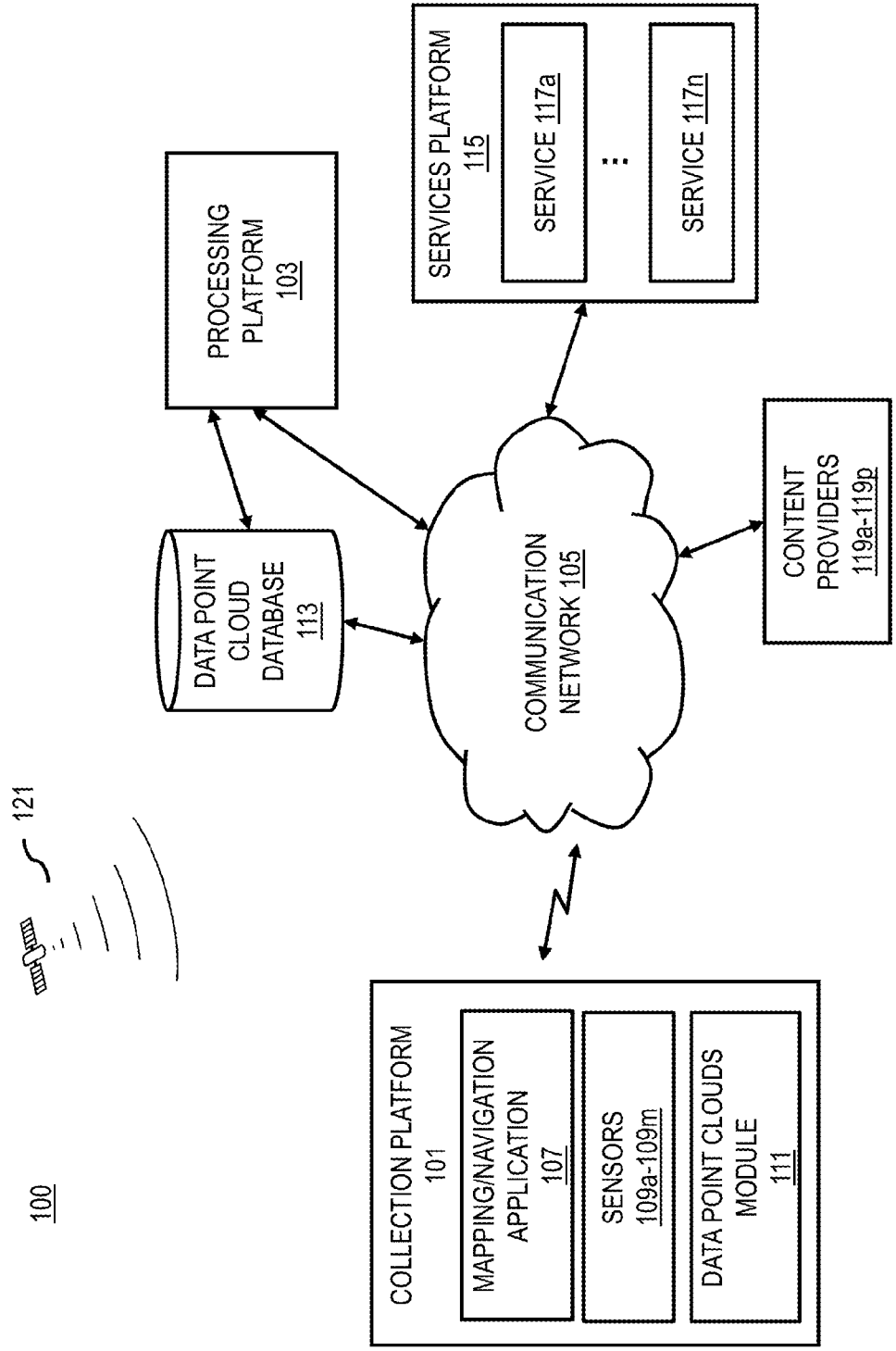
FIG. 1 is a diagram of a system capable of efficiently and accurately process and align one or more portions of a plurality of data point clouds, according to an embodiment.

FIG. 1 is a diagram of a system capable of efficient and accurate processing and aligning of one or more portions of a plurality of data point clouds, according to an embodiment. As previously discussed, one area of interest among service providers and device manufacturers has been accurate and efficient collection and processing of geo-location data associated with transportation networks, buildings, bridges, or any POI that may be identified and included in various location-based services and products. For example, navigation assistance, maps, location-based inquiries, automatic navigation vehicles, or the like may depend on accurate geo-location data. To collect the geo-location data, some service or content providers may utilize vehicles equipped with various sensors (e.g., GPS, radio frequency identification (RFID), LIDAR scanners, microphones, etc.) and cameras (e.g., video, still, etc.) to travel on various roads and at various locations to collect three-dimensional (3D) imaging data and/or trace data, which may be processed at the time of collection and/or at a later time. In one instance, LIDAR may be used for distance measurements via laser and generating data point clouds that are typically obtained by mounting rotating LIDAR scanners on mobile acquisition platforms (e.g., a collection vehicle.) The data about the position and orientation of the vehicle (e.g., from a GPS unit and/or an inertial measurement unit (IMU)) can be combined with the distance measurements to create a 3D model of an indoor or outdoor environment. An IMU device keeps track of accelerations and decelerations in a mobile platform and it typically may be used in conjunction with a GPS device to improve overall accuracy. The models may consist of distinct data points, and may be referred to as "point clouds." However, since there are vast geo-locations to cover, the collection of the data may be at different times or may not be done in one continuous drive. For example, a vehicle may begin driving and collecting geo-location data of a certain area, but may need to stop the collection process for some time (e.g., at the end of day) and resume at a later time (e.g., in the morning.) In another example, multiple vehicles may be utilized to cover a certain area to accelerate the data collection process. In either example, the collected data for that given area will be in a plurality of data point sets, which would need to be processed and integrated to render a comprehensive data point set for that area. Further, the plurality of data point sets may include one or more segments which may be duplicate data for a same POI. For instance, a geo-location data point set for an area between points "A" and "C" may include a first data point set from the point "A" to a point "B" (e.g., from a first collection drive) and a second data point set from the point "B" to a point "C" (e.g., from a second collection drive.) Additionally, since GPS and IMU technologies have non-zero error in their measurements, a LIDAR dataset obtained by one vehicle may be out of alignment with a LIDAR dataset obtained at a different time or by another vehicle. Sometimes a LIDAR dataset may be even out of alignment with itself, since error in GPS and IMU can accumulate over the course of a collection drive. Therefore, there is a need for an efficient and accurate processing and aligning of one or more portions of one or more data point clouds.

To address this problem, a system 100 of FIG. 1 introduces the capability to efficiently and accurately process and align one or more portions of a plurality of data point clouds. Currently, existing LIDAR alignment techniques generally fall into two categories: RANSAC-based (RANdom SAmple Consensus) and ICP-based (Iterative Closest Point) although there are exceptions. RANSAC is a general framework for parameter estimation and alignment where it may randomly sample a data point cloud to identify "outlier" data points, which can result in a solution for finding a large number of "inlier" data points. In an ICP technique, it finds corresponding points between two data point sets and computes an alignment that would pull those points closer together. In either case, the process may repeat until a desired convergence of one or more portions of a plurality of data point clouds is achieved. However, processing and aligning of 3D data point clouds may be slow, complex, and resource intensive since the alignment would have to simultaneously consider the data points in 3D. In one example, one or more portions of two geo-registered point clouds (e.g., LIDAR) may need to be processed and aligned, wherein the resulting output may be a translation in space (e.g., in meters) indicating how far and in which direction the one or more portions of a first point cloud should be moved to be brought into alignment with one or more portions of the second point cloud. The ordering of the point clouds is arbitrary and they are aligned with reference to each other.

In one embodiment, one or more portions of a plurality of 3D data point clouds may be processed, segmented, and aligned in two-dimensions (2D) in latitude/longitude and then in one-dimension (1D) in altitude. This dimensional decomposition is fundamentally different from existing LIDAR alignment techniques, which perform the alignment in 3D. Simplifying the approach both greatly increases speed and reduces complexity. However, the existing techniques, as in large scale optimization frameworks, may utilize complex methods that may cause failures as a consequence of sophisticated optimization schemes, which may make it difficult to determine the root cause and improve an associated algorithm.

In one scenario, a data point cloud may be segmented into horizontal components (e.g., latitude (x-axis) and longitude (y-axis)) and altitude (z-axis). Further, the surface of ground surface in a data point cloud with reference to the data collection vehicle may be identified in the data point cloud. In one embodiment, an algorithm may proceed in two stages by using a method of ground height estimation to either extract or remove points belonging to the surface of the ground. In addition to the LIDAR data, there may be more sparse set of points that correspond to the vehicle's position as the LIDAR scan was acquired, which may be referred to as the "IMU trace." Further, the height of the ground surface underneath each IMU trace is estimated by measuring the minimum elevation of LIDAR data points underneath it, which may yield a very accurate estimation, and is then propagated perpendicularly to the vehicle's travel path to give an estimate of ground height along the path.

In one embodiment, the data points corresponding to the ground surface may be removed (e.g., data points within 0.25 m of the estimated ground height), and the remaining data points are projected vertically into a reference image. In one example, an optimal resolution of the reference image may be approximately at 0.5 m. In one embodiment, an algorithm may process the two images to exhaustively search for an alignment based on one or more parameters determined by a user and/or the algorithm. An alignment between two images may be determined by the number of overlapping pixels. In one embodiment, the search for an alignment may be up to a maximum displacement (e.g., 10 m in each direction) while maintaining the best offset. In one embodiment, an image-space offset may be directly converted back into a measurement (e.g., meters), which may result in latitudinal/longitudinal alignment between the two data point clouds.

In one scenario, after the one or more portions of the two data point clouds have been aligned in latitude and longitude (e.g., horizontal alignment), they can be aligned in altitude (z-axis). In one embodiment, the ground surface (ground level, ground plane) data points may be extracted (e.g., the data points removed/ignored in the earlier steps. Further, the algorithm may determine the vertical difference values between the minimum height in each data point cloud at various locations at the ground surface (e.g., along x-axis or y-axis), and determine mean of the values for use as the vertical misalignment of the two data point clouds.

In one embodiment, the system 100 processes and/or facilitates a processing of imaging data associated with location trace data of at least one link of a road to determine one or more data point clouds for at least one vehicle collecting the imaging data, the location trace data, or a combination thereof. In one embodiment, the processing platform 103 may utilize one or more algorithms for processing imaging data (e.g., video, pictures, etc.) that may have been captured by one or more cameras and/or other sensors (e.g., microphone, radio frequency identification (RFID), light detection and ranging (LIDAR), etc.) Further, the processing platform 103 may process the location trace data (e.g., GPS data) associated with the imaging data either concurrently with or separately from the processing of the imaging data. In one example, the imaging data and/or the associated location trace data may be captured via one or more sensors of one or more devices that may be in/on a vehicle, on a user, and the like, which may be stationary near a road or may be traveling along one or more links (segments) of one or more roads.

In one embodiment, the system 100 determines that the maneuvering information indicates, at least in part, a movement of the at least one vehicle above a threshold value. In one the processing platform 103 may compare a movement determined from the maneuvering information to one or more predefined and/or dynamic threshold values. For example, a predefined threshold value may be a range or certain change in distance from a current location of the vehicle.

In one embodiment, the system 100 causes, at least in part, a comparison of the imaging data with reference to the location trace data based, at least in part, on location information of one or more objects, one or more points of interest (POIs), or a combination thereof available in the imaging data. In one embodiment, the processing platform 103 may compare the imaging data and the associated location trace data with location of one or more objects and/or POIs detected in the imaging data so, for example, the imaging data and the associated location trace data may be calibrated for continuous accuracy.

As shown in FIG. 1, the system 100 comprises a collection platform (CP) 101 having connectivity to a processing platform 103 via a communication network 105. The CP 101 may include and/or have access to a mapping/navigation application 107. By way of example, the mapping/navigation application 107 may include, at least in part, a navigation application, a mapping application, a location-based services application, or a combination thereof. Moreover, the CP 101 may include one or more sensors 109a-109m (also collectively referred to as sensors 109). In one example use case, the sensors 109 may include one or more optical sensors (e.g., cameras), audio sensors (e.g., microphones), a GPS receiver, a LIDAR scanner, a low power positioning module, a compass, a magnetometer, an accelerometer, etc.

In one embodiment, the CP 101 may also include a data point clouds module 111 that has substantially similar capabilities as the processing platform 103. In particular, it is contemplated that one embodiment of the present invention disclosed herein may be fully client-based (i.e., the one or more data point clouds could be pre-processed by the client device.) In one embodiment, data point clouds and any associated imaging data may be communicated via the communication network 105 to the processing platform 103 for stream processing (e.g., real-time processing.) In one embodiment, the data point clouds and any associated imaging data may be communicated via the communication network 105 to the processing platform 103 and/or to one or more other elements of the system 100.

In one embodiment, the processing platform 103 may include or be associated with at least one data point cloud database 113, which may exist in whole or in part within the processing platform 103 or the data point clouds module 111. In various embodiments, the processing platform 103 may exist in whole or in part within the CP 101 or may be implemented as an independent platform. The data point cloud database 113 may include one or more indexed data point clouds associated with the CP 101, including timestamp information, position information (e.g., GPS, cellular triangulation, etc.), velocity information, geo-direction information, or a combination thereof. The data point cloud database 113 may also include one or more service parameters, one or more service suggestions, or a combination thereof associated with the one or more data point clouds. In one example use case, the one or more service parameters, the one or more service suggestions, or a combination thereof may include one or more points of interest (POIs) associated with a data point cloud (e.g., driving through a certain area), one or more location-based markers, one or more descriptions of routes traveled, etc. Further, the data point cloud database 113 may also include mapping data (e.g., roads, addresses, building, etc.).

The CP 101 may be also connected to a services platform 115 via the communication network 105. The services platform 115 may include one or more services 117a-117n (also collectively referred to as services 117.) The services 117 may include a wide-variety of content provisioning services for the mapping/navigation application 107 (e.g., POIs, related media, etc.) In addition, the CP 101, the services platform 115, and the services 117 may be also connected to one or more content providers 119a-119p (also collectively referred to as content providers 119) via the communication network 105. The content providers 119 may provide a wide variety of content (e.g., maps, POIs information, etc.) to the components of the system 100.

In one embodiment, the processing platform 103, the mapping/navigation application 107, or a combination thereof may utilize location-based technologies (e.g., GPS, cellular triangulation, Assistant GPS (A-GPS), etc.) to determine a travel route, a starting point, a stopping point, a movement history, or the like of a CP 101. For example, a CP 101 may include a GPS receiver to obtain geographic coordinates from satellites 121 to determine said information associated with the CP 101.

In one embodiment, the system 100 processes and/or facilitates a processing of sensor information associated with the one or more devices to generate one or more location traces, a movement history, one or more associated data point clouds, or the like. By way of example, the one or more devices may include a GPS receiver, a LIDAR scanner, a low power positioning module, a compass, a magnetometer, an accelerometer, etc.

In one embodiment, the system 100 causes, at least in part, a segmentation of at least one first geo-registered point cloud and at least one second geo-registered point cloud based, at least in part, on an application of a ground surface threshold to one or more respective points in the at least one first geo-registered point cloud and the at least one second geo-registered point cloud. In one embodiment, the processing platform 103 may determine a ground surface threshold and apply the threshold to one or more portions of one or more geo-registered point clouds. In one scenario, a data point cloud may be segmented into horizontal components (e.g., latitude (x-axis) and longitude (y-axis)) and altitude (z-axis). Further, the surface of ground surface in a data point cloud with reference to the data collection vehicle may be identified in the data point cloud. In one embodiment, an algorithm may proceed in two stages by using a method of ground height estimation to either extract or remove points belonging to the surface of the ground.

In one embodiment, the system 100 processes and/or facilitates a processing of the one or more respective points that are above the ground surface threshold to determine a horizontal offset for a horizontal alignment of the at least one first geo-registered point cloud and the at least one second geo-registered point cloud. In one embodiment, the processing platform 103 may process the one or more points in the at least one first an done second geo-registered point clouds that are about the ground surface threshold for determining a horizontal offset, which may be used for a horizontal alignment of the at least one first and second geo-registered point clouds. In one example, the horizontal alignment may be viewed in a 3D illustration where the horizontal alignment is a 2D plane along the x-axis and the y-axis. In one embodiment, the horizontal offset may be in either direction along the x-axis and the y-axis. For example, the horizontal offset may be to the left, the right, up, or down direction. In various scenarios, any data point cloud in a plurality of data point clouds may be utilized as a reference so that the remaining data point clouds may be aligned to it.

In one embodiment, the system 100 processes and/or facilitates a processing of the one or more respective points that are below the ground surface threshold to determine a vertical offset for a vertical alignment of the at least one first geo-registered point cloud and the at least one second geo-registered point cloud. In one embodiment, the processing platform 103 may determine a vertical offset vertical difference values between the minimum height in each data point cloud at various locations at the ground surface (e.g., along x-axis or y-axis), and determine mean of the values for use as the vertical misalignment of the two data point clouds.

In one embodiment, the system 100 determines trace information for at least one vehicle capturing the at least two geo-registered point clouds. In one embodiment, in addition to the LIDAR data, there may be a more sparse set of data points that correspond to a measuring vehicle's travel route or position as a LIDAR scan is acquired where the trace may be referred to as an "IMU trace."

In one embodiment, the system 100 determines the ground surface threshold based, at least in part, on the trace information. In one embodiment, the ground surface threshold may be determined by estimating the height of the ground surface underneath each IMU trace by measuring the minimum elevation of LIDAR points under the IMU trace. In one scenario, this estimation is very accurate, which is then propagated perpendicularly to the vehicle's travel path to provide an estimate of ground height along the vehicles travel path.

In one embodiment, the system 100 causes, at least in part, a projection of the one or more respective points that are above the ground surface threshold for the at least one first geo-registered point cloud into at least one first horizontal image. In one embodiment, the data points in the first geo-registered point cloud corresponding to the ground surface may be removed (e.g., data points within 0.25 m of the estimated ground height), and the remaining data points are projected vertically into a first horizontal reference image.

In one embodiment, the system 100 causes, at least in part, a projection of the one or more respective points that are above the ground surface threshold for the at least one second geo-registered point cloud into at least one second horizontal image. In one embodiment, the data points in the second geo-registered point cloud corresponding to the ground surface may be removed (e.g., data points within 0.25 m of the estimated ground height), and the remaining data points are projected vertically into a second horizontal reference image.

In one embodiment, the system 100 determines the horizontal offset based, at least in part, on an alignment along two directional axes of the at least one first horizontal image and the at least one second horizontal image, wherein the two directional axes include, at least in part, a latitudinal axis and a longitudinal axis. In one embodiment, the processing platform 103 may determine the horizontal offset along the latitudinal and longitudinal axes based on a difference in distance between a data point in the first data point cloud and a data point in the second data point client along the latitudinal and longitudinal axes. For example, a difference between a data point of the first data point cloud and a point of the second data point cloud along the latitudinal axis may be three meters.

In one embodiment, the system 100 determines the alignment of the at least one first horizontal image and the at least one second horizontal image based, at least in part, on determining a number of one or more overlapping pixels between the at least one first horizontal image and the at least one second horizontal image. In one embodiment, the processing platform 103 may utilize one or more algorithms to analyze and compare overlapping of one or more pixels between the first and the second horizontal images. For instance, an overlapping all a plurality of pixels in the first and the second horizontal images may signify an alignment between the two images.

In one embodiment, the system 100 determines the horizontal offset based, at least in part, on a distance represented by the one or more overlapping pixels. In one scenario, the processing platform 103 may determine the horizontal offset based on a distance in the x-axis and/or y-axis between one or more overlapping pixels of the first and the second horizontal images. For example, a portion of a first data point cloud, with reference to a portion of a second data point cloud, may have a horizontal offset of five meters in the x-axis and three meters the y-axis.

In one embodiment, the system 100 processes and/or facilitates a processing of the vertical offset to determine a mean value based, at least in part, on one or more height differences between one or more minimum heights along the ground surface in the at least one first geo-registered point cloud and the ground surface in the at least one second geo-registered point cloud. In one scenario, after the data point clouds have been horizontally aligned (e.g., in latitude and longitude), they may be aligned in altitude (e.g., z-axis.) In one embodiment, the processing platform 103 may cause an extraction of the ground surface points to determine a vertical difference values between the minimum height in each point cloud at various locations (e.g., along the x-axis or y-axis) on the ground surface, where a filtered mean of the values may be taken as the vertical misalignment value between the two data point clouds.

In one embodiment, the system 100 causes, at least in part, a vertical alignment of horizontally aligned the at least one first geo-registered point cloud and the at least one second geo-registered point cloud based, at least in part, on the mean value. For example, a mean value of five meters may be used to perform a vertical alignment of the horizontally aligned first and second geo-registered data point clouds.

In one embodiment, the system 100 causes, at least in part, the horizontal alignment based, at least in part, on a maximum displacement in the latitudinal axis, the longitudinal axis, or a combination thereof. In one instance, the maximum displacement may be predefined by a user and/or an algorithm, wherein the displacement may be in either direction along the latitudinal and the longitudinal axes, which may be the same or different.

In one embodiment, the system 100 determines an anticipated error in location information associated with respective points of the at least one first geo-registered point cloud and the at least one second geo-registered point cloud based, at least in part, on respective location information of the at least one vehicle when capturing the at least one first geo-registered point cloud and the at least one second geo-registered point cloud. In one embodiment, an anticipated error may be determined from a GPS receiver utilized along with other sensors for capturing the one or more geo-registered point clouds. For instance, an error which may be associated with GPS location information available at the time of capturing the one or more geo-registered point clouds may be utilized and correlated with the measured or scanned data points in the geo-registered point clouds for determining an anticipated error. For example, we may know that the GPS location information may be offset by 10 meters at the time of capturing or more data points in the geo-registered point clouds.

In one embodiment, the system 100 causes, at least in part, the horizontal alignment, the vertical alignment, or a combination thereof based, at least in part, on one or more iteration thresholds determined by a user, by an algorithm, or a combination thereof. In one scenario, a user may define a number of iterations that an algorithm may try and perform the horizontal and/or the vertical alignment of one or more portions of a plurality of data point clouds. For example, a user may set a high number for the iterations in order to achieve better alignments.

In one embodiment, the system 100 determines an accuracy rate for the horizontal alignment, the vertical alignment, or a combination thereof. In one embodiment, the accuracy rate may be determined from a difference in distance between one or more overlapping points (e.g., in x, y, or z axes) in a plurality of geo-registered point clouds. In one embodiment, the difference in distance may be determined from the pixel size defined for either the horizontal or vertical alignment.

In one embodiment, the system 100 causes, at least in part, an adjustment to the one or more iteration thresholds based, at least in part, on the accuracy rate. In one embodiment, a user or an algorithm may utilize the determined accuracy rate to further adjust the number of iterations that an algorithm may attempt to perform the horizontal or vertical alignments of a plurality of data point clouds. For example, if the accuracy rate is determined to be low (e.g., 45%), then the number of iterations may be increased so that a better accuracy rate may be obtained.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The CP 101 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the CP 101 can support any type of interface to the user (such as "wearable" circuitry, etc.).

By way of example, the CP 101, the processing platform 103, the mapping/navigation application 107, the data point clouds module 111, the services 117, the content providers 119, and the satellites 121 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
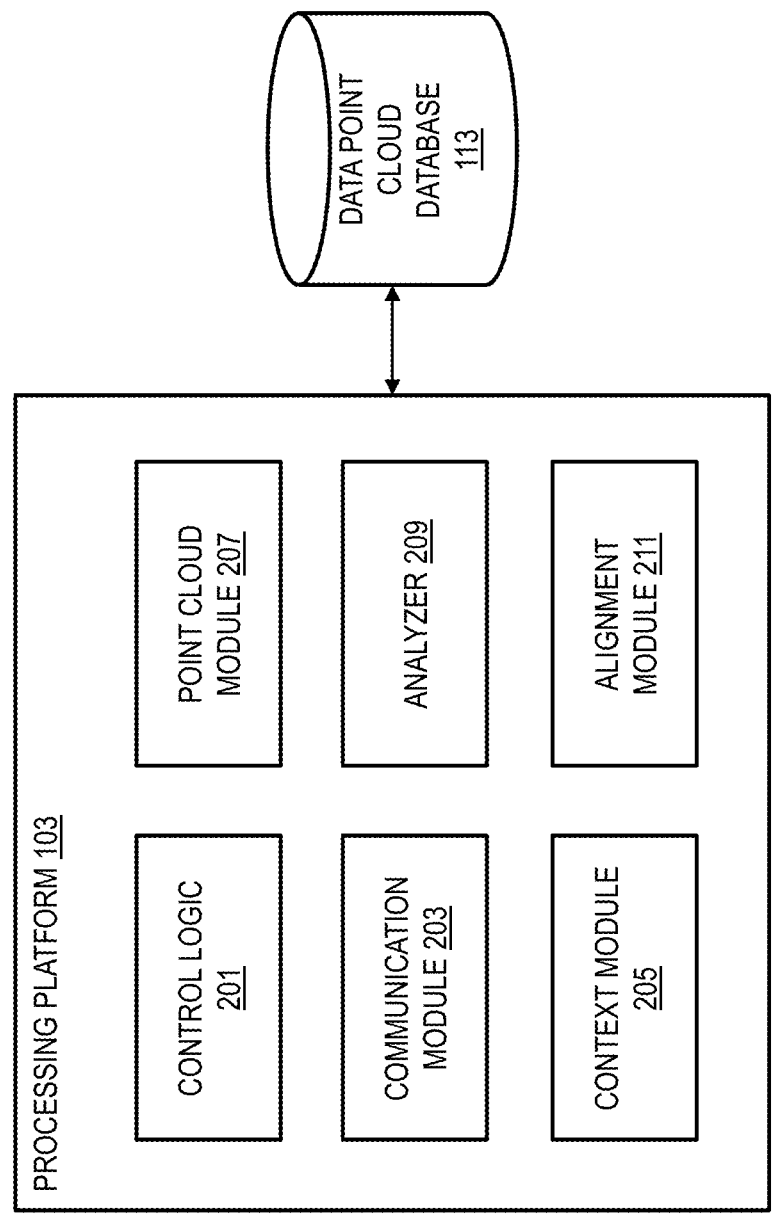
FIG. 2 is a diagram of the components of a data point cloud processing platform, according to an embodiment.

FIG. 2 is a diagram of the components of data point cloud processing platform, according to an embodiment. Again, while the processing platform 103 and the data point clouds module 111 may be interchangeable, the various embodiments of the present invention disclosed herein mainly reference the processing platform 103 for the describing some of the functionalities therein. By way of example, the processing platform 103 includes one or more components for processing contemporaneous data point clouds associated location trace data of a CP 101 (e.g., on/in a vehicle) traveling on a roadway where one or more algorithms and methods may be utilized in the processing. Further, the processing platform 103 may determine one or more adjustments (e.g., offsets) for rendering the 2D and 1D alignment of one or more portions of a plurality of data point clouds by using a 3D collected GPS/IMU drive traces to determine the 2D and 1D segments of the data point clouds. It is contemplated that the functions of these components may be combined in one or more components or performed by other components of equivalent functionality. In this embodiment, the processing platform 103 includes a control logic 201, a communication module 203, a context module 205, a point cloud module 207, an analyzer module 209, and an alignment module 211.

The control logic 201 oversees tasks, including tasks performed by the communication module 203, the context module 205, the point cloud module 207, the analyzer module 209, and the alignment module 211. For example, although the other modules may perform the actual task, the control logic 201 may determine when and how those tasks are performed or otherwise direct the other modules to perform the task. In one embodiment, the control logic 201 may determine to process the one or more location traces in substantially real-time, batch mode, according to a schedule, or a combination thereof. By way of example, the schedule may be based, at least in part, on computational resources, amount of available data, etc.

The communication module 203 is used for communication between the CP 101, the processing platform 103, the mapping/navigation application 107, the sensors 109, the data point clouds module 111, the data point cloud database 113, the service 117, the content providers 119, and the satellites 121. The communication module 203 may also be used to communicate commands, requests, data, etc. The communication module 203 also may be used to determine a request from one or more applications (e.g., receive the request from the mapping/navigation application 107) for location information associated with at least one CP 101. The communication module 203 also may be used to cause, at least in part, a return or transmission of the one or more location traces, imaging data, POIs information, and the like to the one or more applications (e.g., the mapping/navigation application 107).

In one embodiment, the context module 205 processes and/or facilitates a processing of location trace data, which may include at least a portion of a movement history. By way of example, the location trace data may include, at least in part, timestamp information, position information, velocity information, direction information, or a combination thereof. In one embodiment, the context module 205 may process the data point clouds for determining presence and location of one or more POIs for associating with a corresponding portion of the location trace data.

The point cloud module 207, in certain embodiments, is used to cause, at least in part, a generation of one or more data point clouds based on geo-location data captured via one or more scanners and/or sensors; for example, location trace data, possible maneuvering data, one or more POIs information, or a combination thereof on the CP 101, a server (e.g., processing platform 103), or a combination thereof. Further, the point cloud module may segment one or more portions of a data point cloud for further processing and alignment.

In one embodiment, the analyzer module 209 processes and/or facilitates a processing of a plurality of data point clouds for alignment of one or more portions of the data point clouds. For example, the analyzer may employ one or more algorithms to process the data point clouds to determine the one or more portions that may need to be aligned. In one embodiment, the analyzer module 209 may analyze the data point clouds concurrently as processing the associated location trace data for determining one or more adjustments due to a repetition of a portion of the data and a misalignment therein. In one embodiment, the adjustments may be annotated and later processed into the data point clouds. The analyzer module 209 may also be used to cause, at least in part, a comparison of the one or more portions in a plurality of data point clouds.

In one embodiment, the alignment module 211 may determine one or more adjustment/offset values for one or more portions of a plurality of data point clouds based, at least in part, on the results from the analyzer module 209, wherein the adjustment values are to offset one or more portions of the data point clouds. In one embodiment, the alignment module 211 may determine a ground surface threshold and apply the threshold to one or more portions of one or more geo-registered point clouds. In one scenario, a data point cloud may be segmented into horizontal components. Further, the surface of ground surface in a data point cloud with reference to the data collection vehicle may be identified in the data point cloud. In one embodiment, the alignment module 211 may proceed in two stages by using a method of ground height estimation to either extract or remove points belonging to the surface of the ground.

Figure 9:
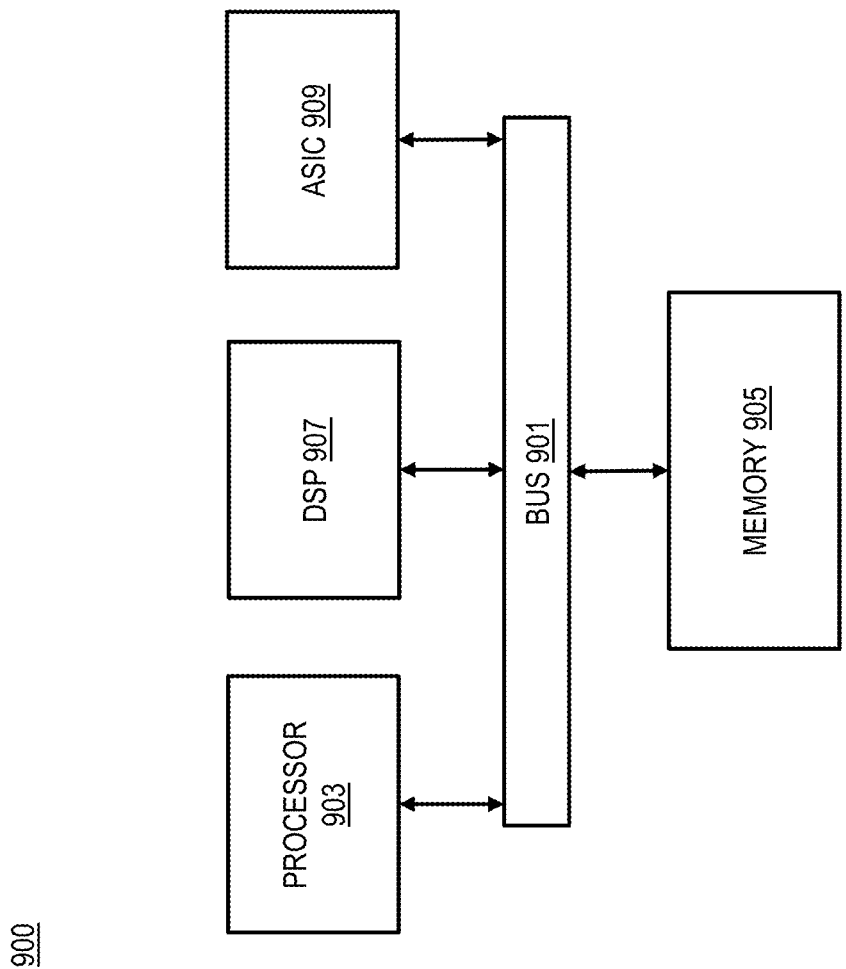
FIG. 9 is a diagram of a chip set that can be used to implement an embodiment of the invention.

FIGS. 3 through 6 are flowcharts of various processes for, at least, efficiently and accurately process and align one or more portions of a plurality of data point clouds, according to various embodiments. In various embodiments, processing platform 103 and/or the collection platform 101 may perform one or more portions of the processes 300, 400, 500, and 600, which may be implemented in, for instance, a chip set including a processor and a memory as shown in FIG. 9. As such, the processing platform 103 and/or the collection platform 101 can provide means for accomplishing various parts of the process 300, 400, 500, and 600 as well as means for accomplishing other processes in conjunction with other components of the system 100. Throughout these processes, the processing platform 103 and/or the collection platform 101 may be referred to as completing various portions of the processes 300, 400, 500, and 600, however, it is understood that other components of the system 100 can perform some of and/or all of the process steps. Further, for clarity in discussing the 300, 400, 500, and 600 processes, the processing platform 103 is referred to as completing various steps of said processes; however, said processes and/or example steps described therein may be performed in any suitable order and/or may be optional.

Figure 3:
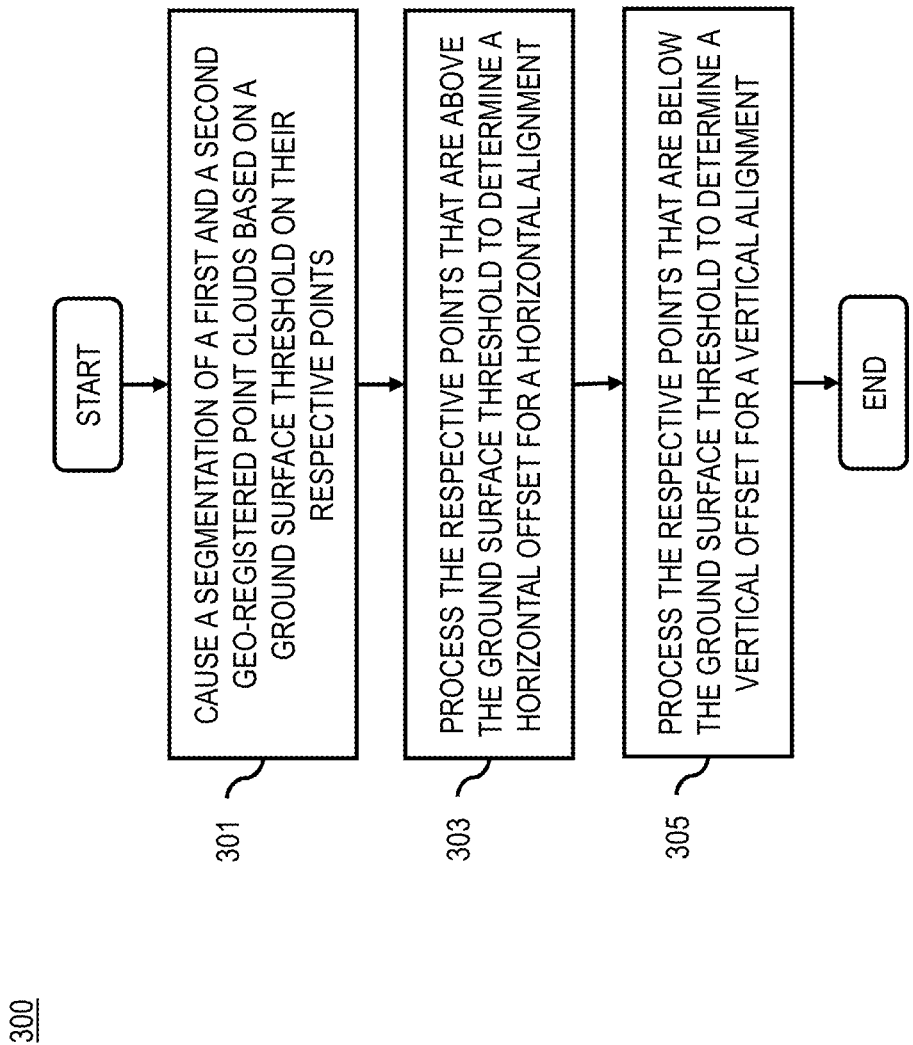
FIGS. 3 through 6 are flowcharts of various processes for, at least, efficiently and accurately process and align one or more portions of a plurality of data point clouds, according to various embodiments.

The process 300 may begin at step 301 of the FIG. 3, where the processing platform 103 may cause, at least in part, a segmentation of at least one first geo-registered point cloud and at least one second geo-registered point cloud based, at least in part, on an application of a ground surface threshold to one or more respective points in the at least one first geo-registered point cloud and the at least one second geo-registered point cloud. In one embodiment, the processing platform 103 may determine a ground surface threshold and apply the threshold to one or more portions of one or more geo-registered point clouds. In one scenario, a data point cloud may be segmented into horizontal components (e.g., latitude (x-axis) and longitude (y-axis)) and altitude (z-axis). Further, the surface of ground surface in a data point cloud with reference to the data collection vehicle may be identified in the data point cloud. In one embodiment, an algorithm may proceed in two stages by using a method of ground height estimation to either extract or remove points belonging to the surface of the ground.

In step 303, the processing platform 103 may process and/or facilitate a processing of the one or more respective points that are above the ground surface threshold to determine a horizontal offset for a horizontal alignment of the at least one first geo-registered point cloud and the at least one second geo-registered point cloud. In one embodiment, the processing platform 103 may process the one or more points in the at least one first an done second geo-registered point clouds that are about the ground surface threshold for determining a horizontal offset, which may be used for a horizontal alignment of the at least one first and second geo-registered point clouds. In one example, the horizontal alignment may be viewed in a 3D illustration where the horizontal alignment is a 2D plane along the x-axis and the y-axis. In one embodiment, the horizontal offset may be in either direction along the x-axis and the y-axis. For example, the horizontal offset may be to the left, the right, up, or down direction. In various scenarios, any data point cloud in a plurality of data point clouds may be utilized as a reference so that the remaining data point clouds may be aligned to it.

In step 305, the processing platform 103 may process and/or facilitate a processing of the one or more respective points that are below the ground surface threshold to determine a vertical offset for a vertical alignment of the at least one first geo-registered point cloud and the at least one second geo-registered point cloud. In one embodiment, the processing platform 103 may determine a vertical offset vertical difference values between the minimum height in each data point cloud at various locations at the ground surface (e.g., along x-axis or y-axis), and determine mean of the values for use as the vertical misalignment of the two data point clouds.

Figure 4:
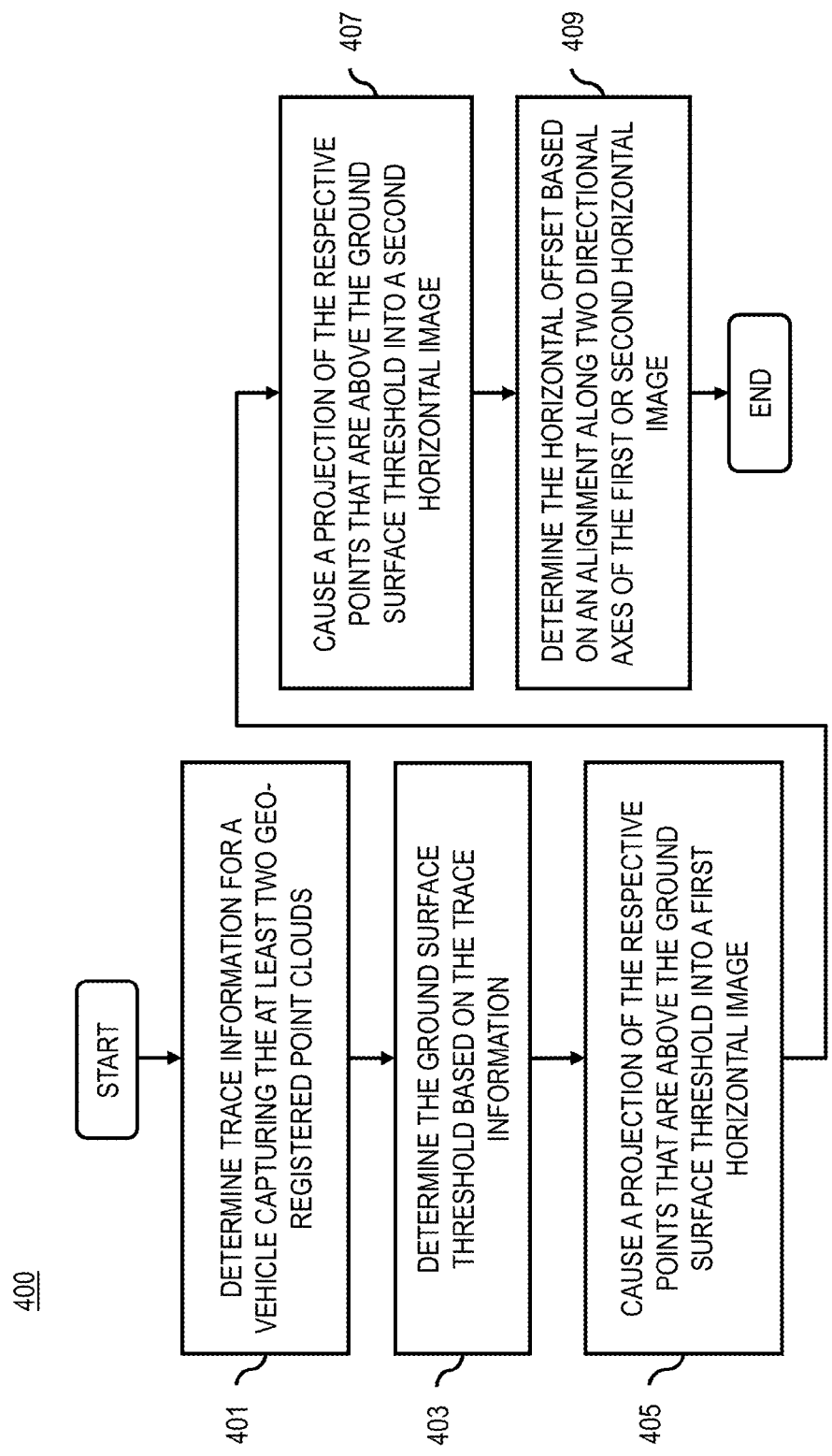

The process 400 may begin at step 401 of the FIG. 4, where the processing platform 103 may determine trace information for at least one vehicle capturing the at least two geo-registered point clouds. In one embodiment, in addition to the LIDAR data, there may be a more sparse set of data points that correspond to a measuring vehicle's travel route or position as a LIDAR scan is acquired where the trace may be referred to as an "IMU trace."

In step 403, the processing platform 103 may determine the ground surface threshold based, at least in part, on the trace information. In one embodiment, the ground surface threshold may be determined by estimating the height of the ground surface underneath each IMU trace by measuring the minimum elevation of LIDAR points under the IMU trace. In one scenario, this estimation is very accurate, which is then propagated perpendicularly to the vehicle's travel path to provide an estimate of ground height along the vehicles travel path.

In step 405, the processing platform 103 may cause, at least in part, a projection of the one or more respective points that are above the ground surface threshold for the at least one first geo-registered point cloud into at least one first horizontal image. In one embodiment, the data points in the first geo-registered point cloud corresponding to the ground surface may be removed (e.g., data points within 0.25 m of the estimated ground height), and the remaining data points are projected vertically into a first horizontal reference image.

In step 407, the processing platform 103 may causes, at least in part, a projection of the one or more respective points that are above the ground surface threshold for the at least one second geo-registered point cloud into at least one second horizontal image. In one embodiment, the data points in the second geo-registered point cloud corresponding to the ground surface may be removed (e.g., data points within 0.25 m of the estimated ground height), and the remaining data points are projected vertically into a second horizontal reference image.

In step 409 the processing platform 103 may determines the horizontal offset based, at least in part, on an alignment along two directional axes of the at least one first horizontal image and the at least one second horizontal image, wherein the two directional axes include, at least in part, a latitudinal axis and a longitudinal axis. In one embodiment, the processing platform 103 may determine the horizontal offset along the latitudinal and longitudinal axes based on a difference in distance between a data point in the first data point cloud and a data point in the second data point client along the latitudinal and longitudinal axes. For example, a difference between a data point of the first data point cloud and a point of the second data point cloud along the latitudinal axis may be three meters.

Figure 5:
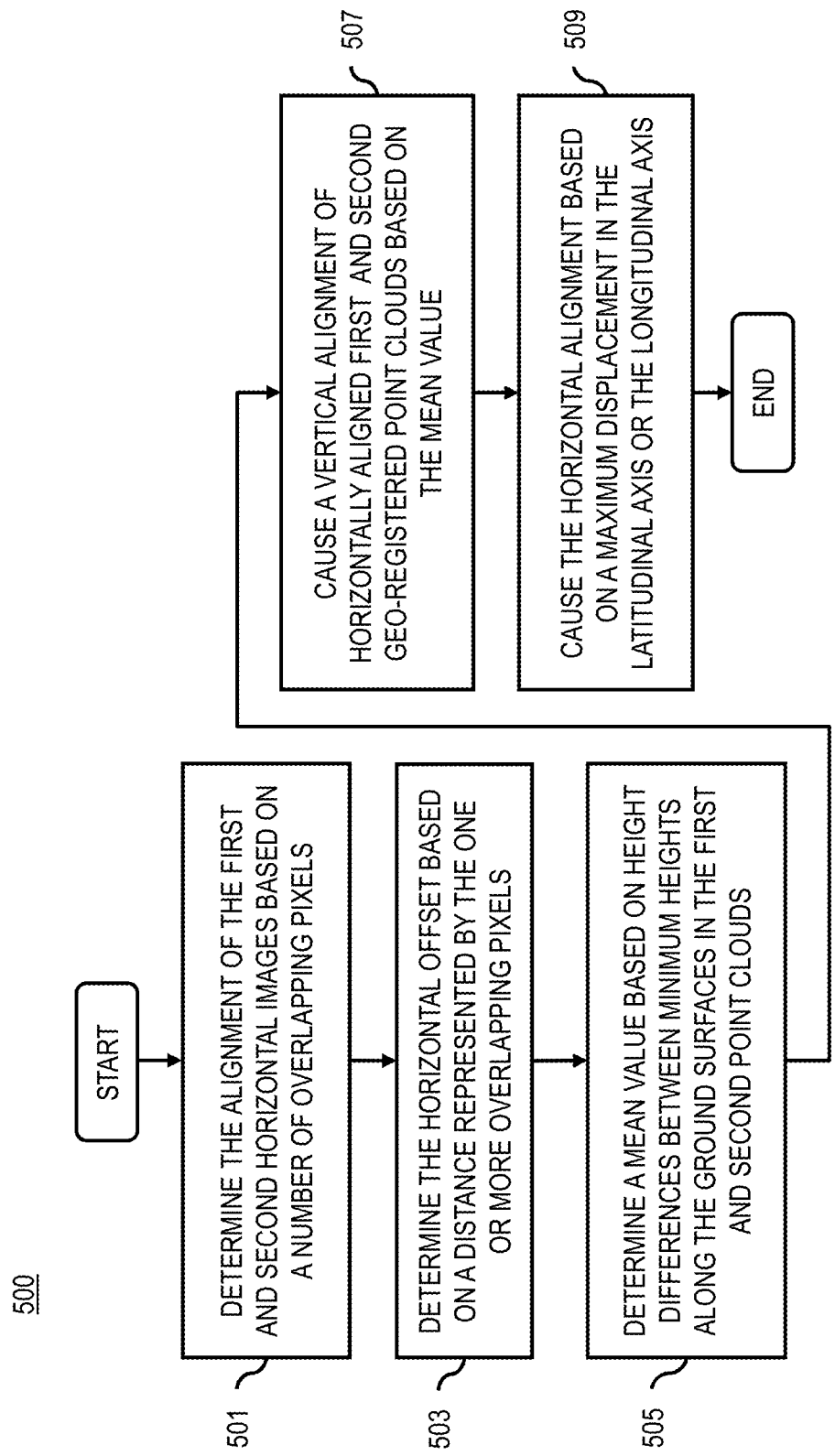

The process 500 may begin at step 501 of the FIG. 5, where the processing platform 103 may determine the alignment of the at least one first horizontal image and the at least one second horizontal image based, at least in part, on determining a number of one or more overlapping pixels between the at least one first horizontal image and the at least one second horizontal image. In one embodiment, the processing platform 103 may utilize one or more algorithms to analyze and compare overlapping of one or more pixels between the first and the second horizontal images. For instance, an overlapping all a plurality of pixels in the first and the second horizontal images may signify an alignment between the two images.

In step 503, the processing platform 103 may determine the horizontal offset based, at least in part, on a distance represented by the one or more overlapping pixels. In one scenario, the processing platform 103 may determine the horizontal offset based on a distance in the x-axis and/or y-axis between one or more overlapping pixels of the first and the second horizontal images. For example, a portion of a first data point cloud, with reference to a portion of a second data point cloud, may have a horizontal offset of five meters in the x-axis and three meters the y-axis.

In step 505, the processing platform 103 may process and/or facilitate a processing of the vertical offset to determine a mean value based, at least in part, on one or more height differences between one or more minimum heights along the ground surface in the at least one first geo-registered point cloud and the ground surface in the at least one second geo-registered point cloud. In one scenario, after the data point clouds have been horizontally aligned (e.g., in latitude and longitude), they may be aligned in altitude (e.g., z-axis.) In one embodiment, the processing platform 103 may cause an extraction of the ground surface points to determine a vertical difference values between the minimum height in each point cloud at various locations (e.g., along the x-axis or y-axis) on the ground surface, where a filtered mean of the values may be taken as the vertical misalignment value between the two data point clouds.

In step 507, the processing platform 103 may cause, at least in part, a vertical alignment of horizontally aligned the at least one first geo-registered point cloud and the at least one second geo-registered point cloud based, at least in part, on the mean value. For example, a mean value of five meters may be used to perform a vertical alignment of the horizontally aligned first and second geo-registered data point clouds.

In step 509, the processing platform 103 may cause, at least in part, the horizontal alignment based, at least in part, on a maximum displacement in the latitudinal axis, the longitudinal axis, or a combination thereof. In one instance, the maximum displacement may be predefined by a user and/or an algorithm, wherein the displacement may be in either direction along the latitudinal and the longitudinal axes, which may be the same or different.

Figure 6:
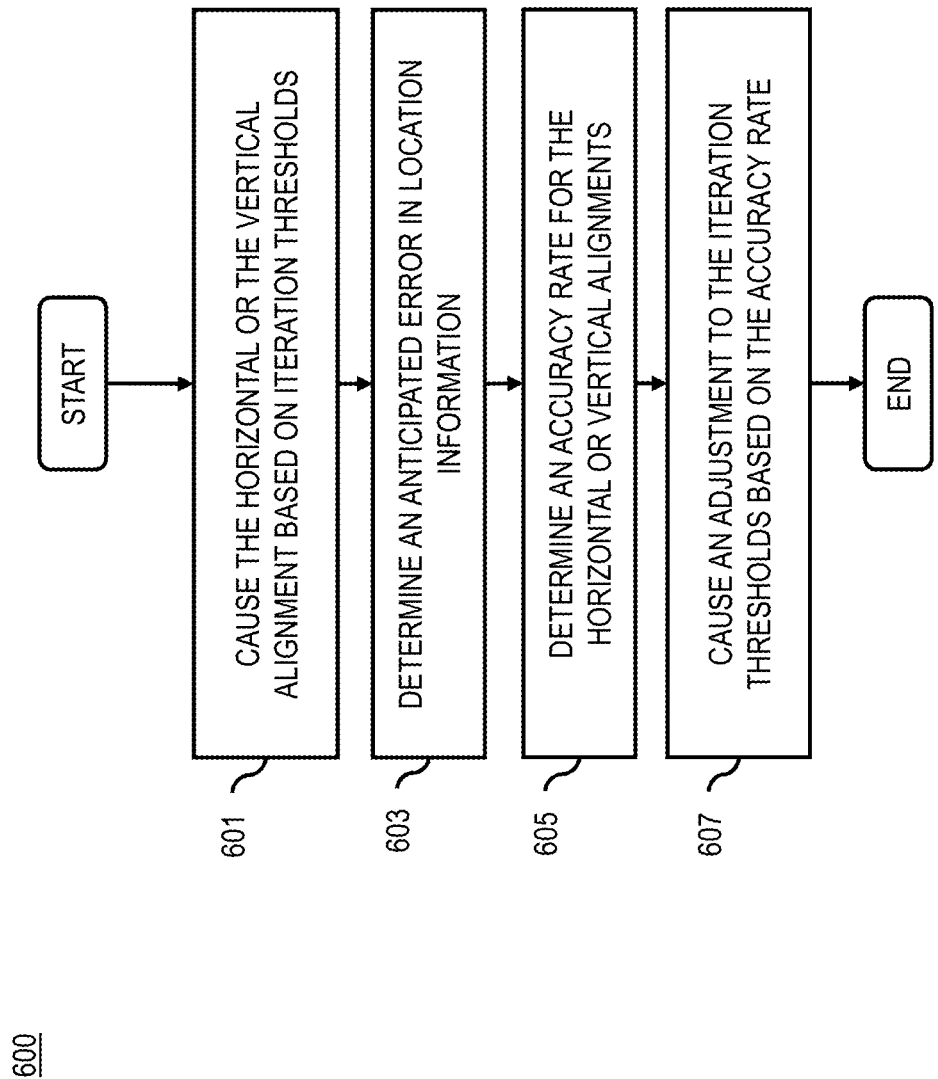

The process 600 may begin at step 601 of the FIG. 6, where the processing platform 103 may cause, at least in part, the horizontal alignment, the vertical alignment, or a combination thereof based, at least in part, on one or more iteration thresholds determined by a user, by an algorithm, or a combination thereof. In one scenario, a user may define a number of iterations that an algorithm may try and perform the horizontal and/or the vertical alignment of one or more portions of a plurality of data point clouds. For example, a user may set a high number for the iterations in order to achieve better alignments.

In step 603, the processing platform 103 may determine an anticipated error in location information associated with respective points of the at least one first geo-registered point cloud and the at least one second geo-registered point cloud based, at least in part, on respective location information of the at least one vehicle when capturing the at least one first geo-registered point cloud and the at least one second geo-registered point cloud. In one embodiment, an anticipated error may be determined from a GPS receiver utilized along with other sensors for capturing the one or more geo-registered point clouds. For instance, an error which may be associated with GPS location information available at the time of capturing the one or more geo-registered point clouds may be utilized and correlated with the measured or scanned data points in the geo-registered point clouds for determining an anticipated error. For example, we may know that the GPS location information may be offset by 10 meters at the time of capturing or more data points in the geo-registered point clouds.

In step 605, the processing platform 103 may determine an accuracy rate for the horizontal alignment, the vertical alignment, or a combination thereof. In one embodiment, the accuracy rate may be determined from a difference in distance between one or more overlapping points (e.g., in x, y, or z axes) in a plurality of geo-registered point clouds. In one embodiment, the difference in distance may be determined from the pixel size defined for either the horizontal or vertical alignment.

In step 607, the processing platform 103 may cause, at least in part, an adjustment to the one or more iteration thresholds based, at least in part, on the accuracy rate. In one embodiment, a user or an algorithm may utilize the determined accuracy rate to further adjust the number of iterations that an algorithm may attempt to perform the horizontal or vertical alignments of a plurality of data point clouds. For example, if the accuracy rate is determined to be low (e.g., 45%), then the number of iterations may be increased so that a better accuracy rate may be obtained.

FIGS. 7A through 7I illustrate various depictions of aligning one or more portions of two data point clouds.

Figure 7A:
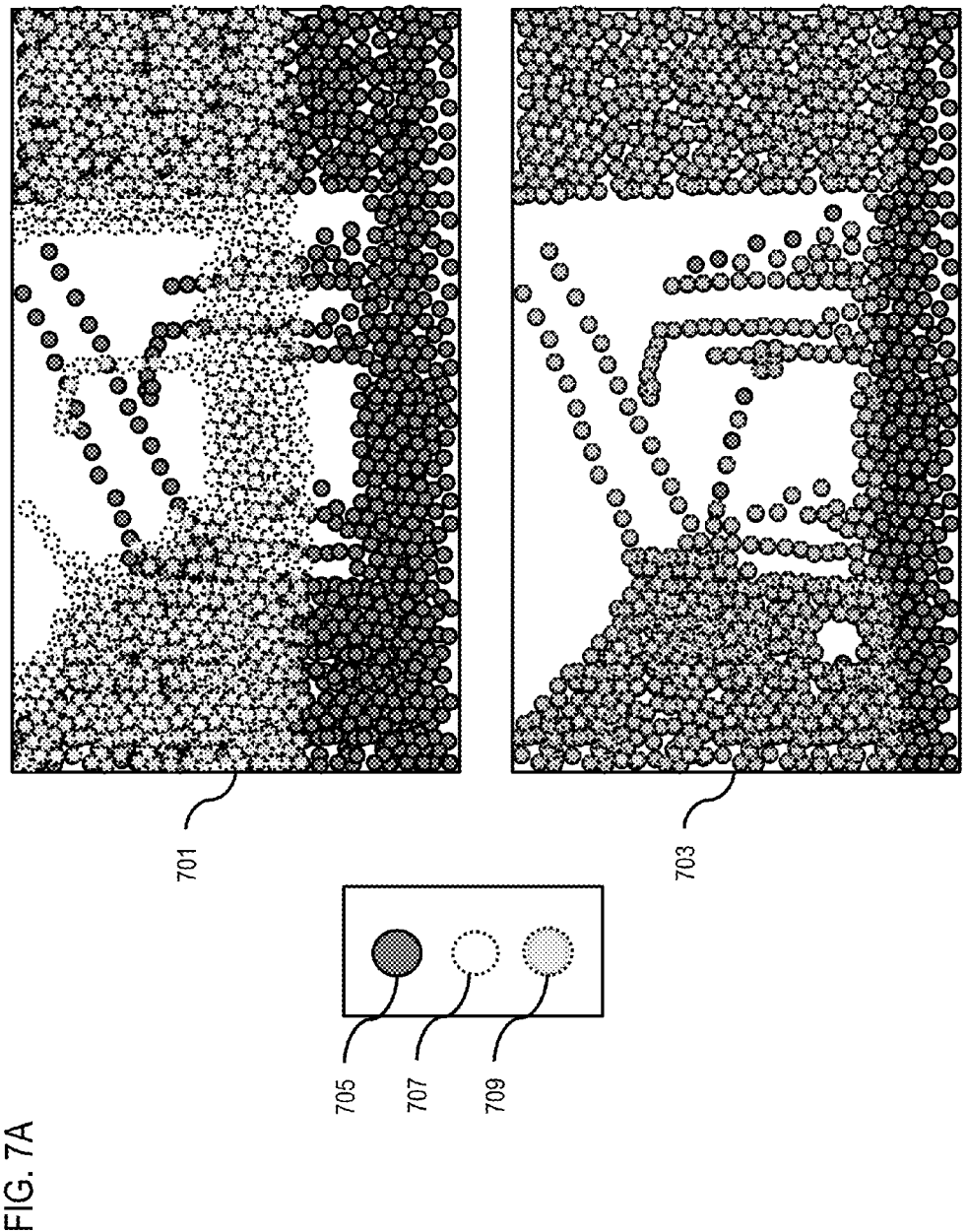
Figure 7B:
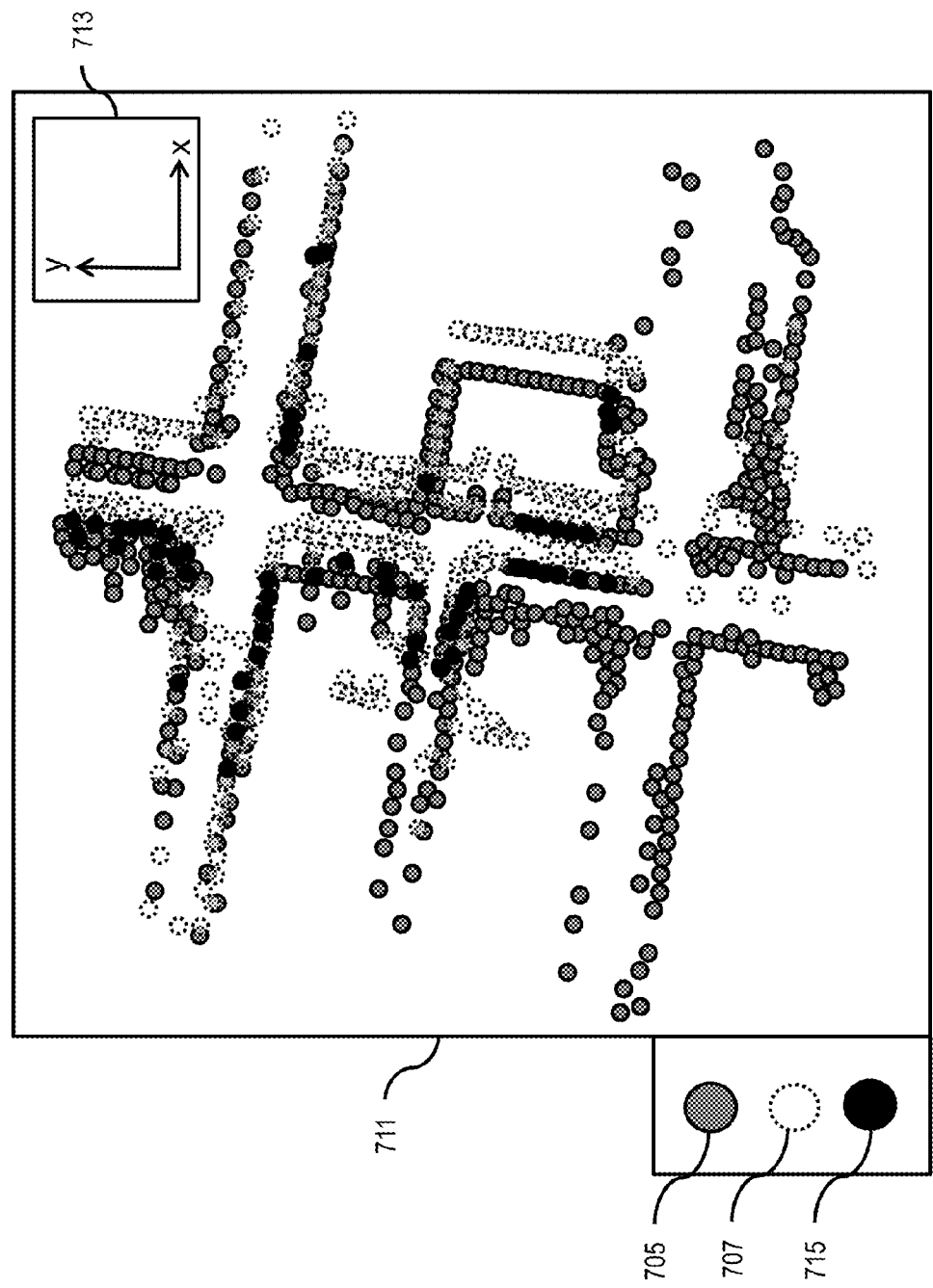
Figure 7C:
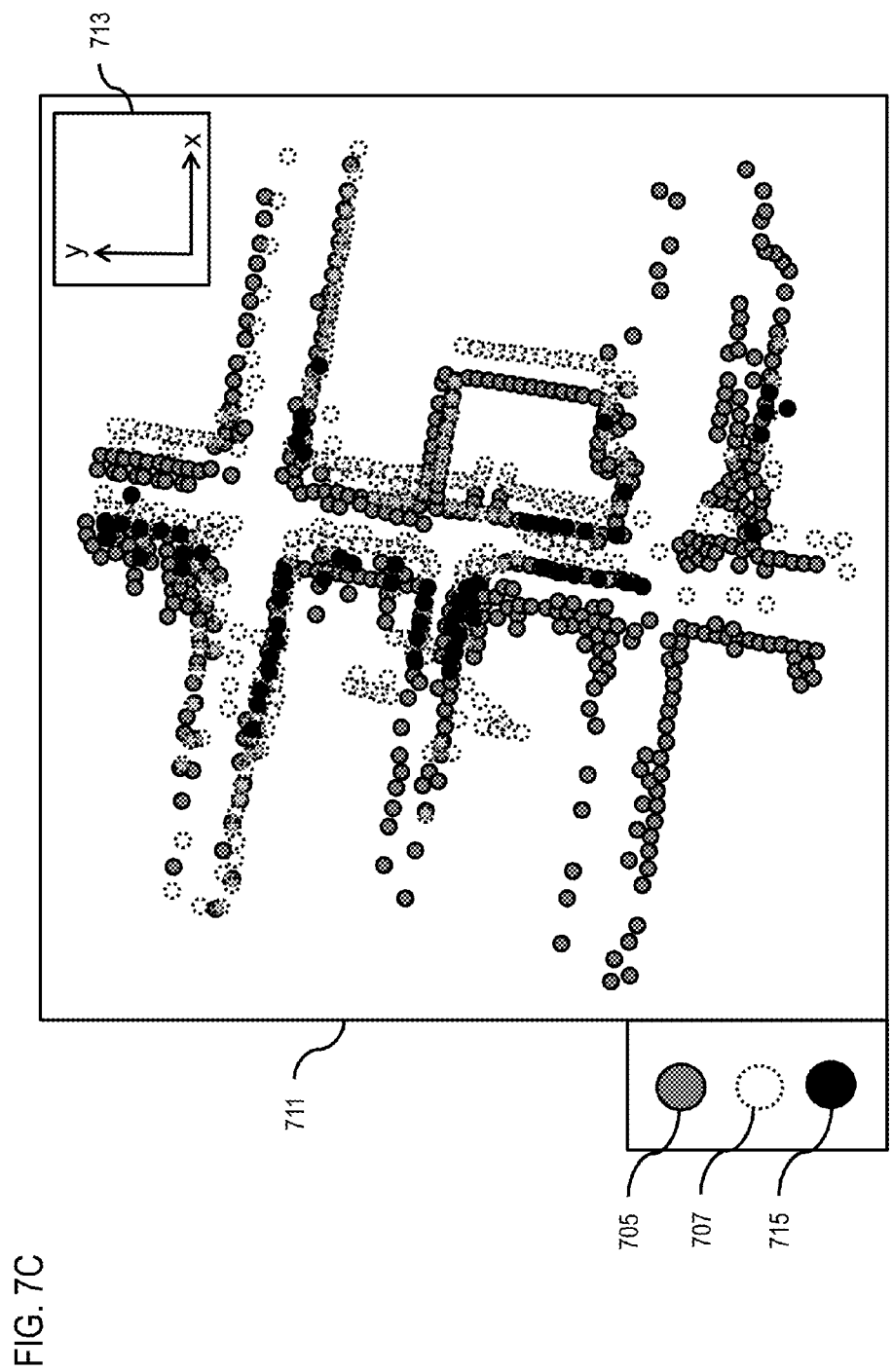
Figure 7D:
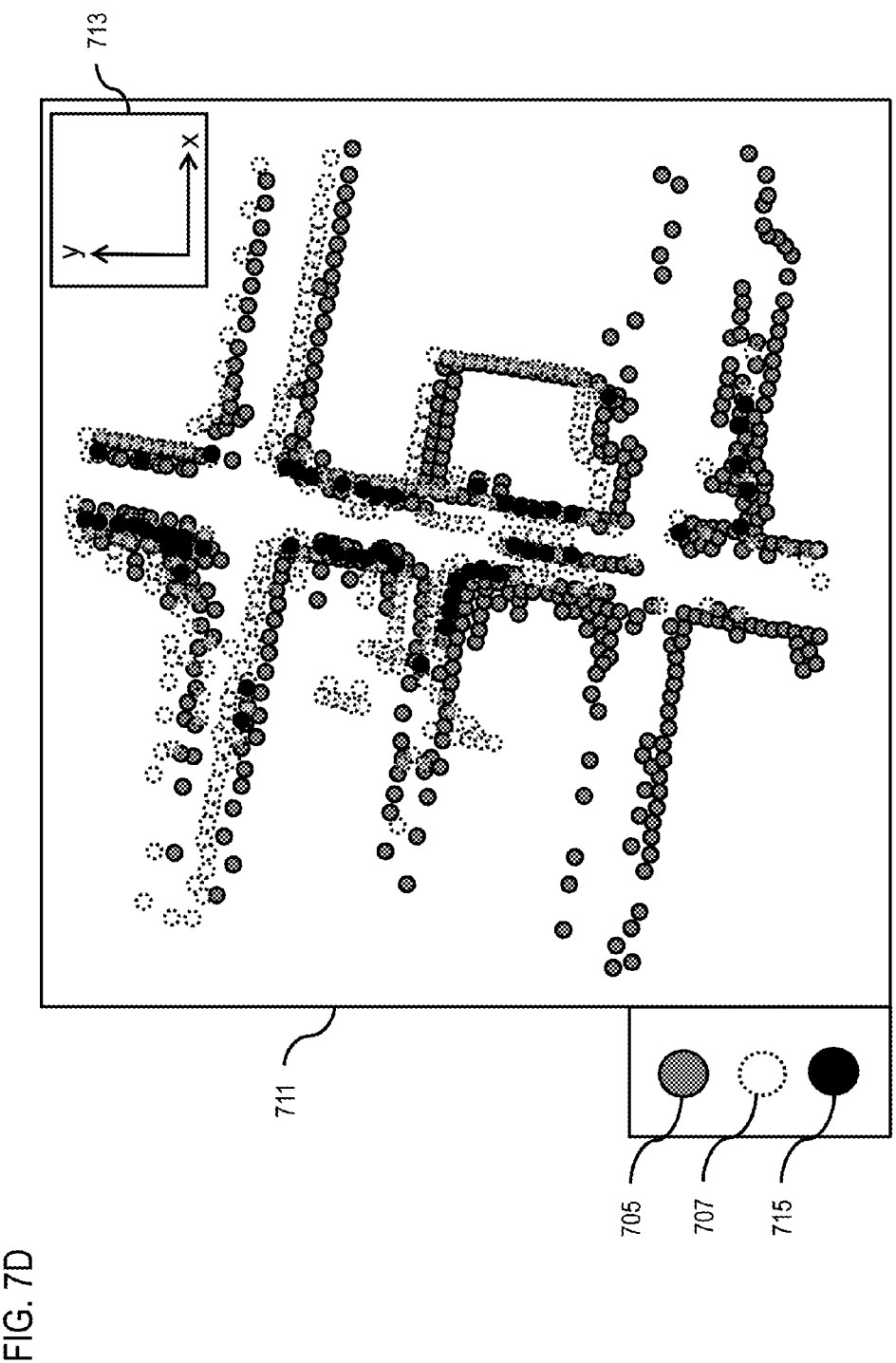
Figure 7E:
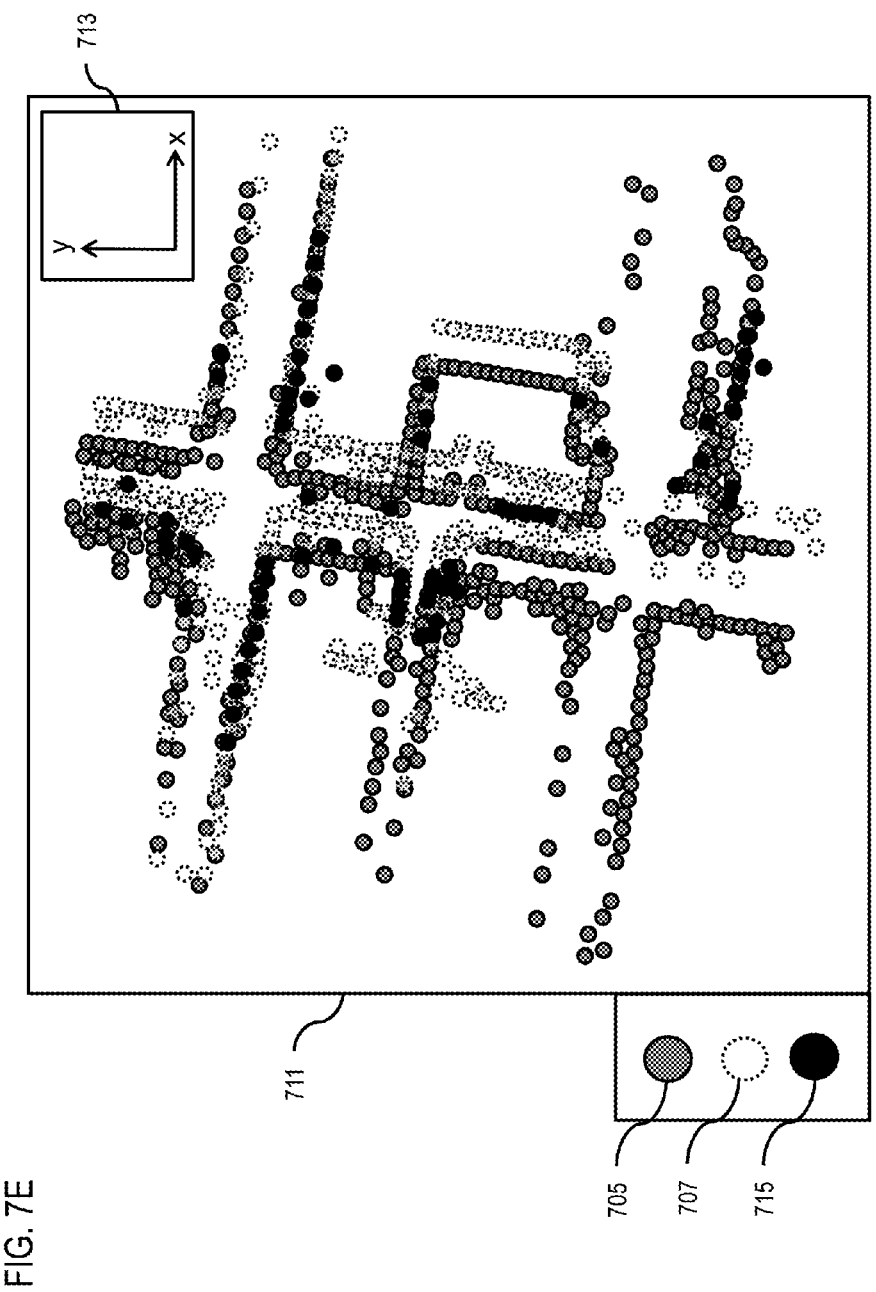
Figure 7F:
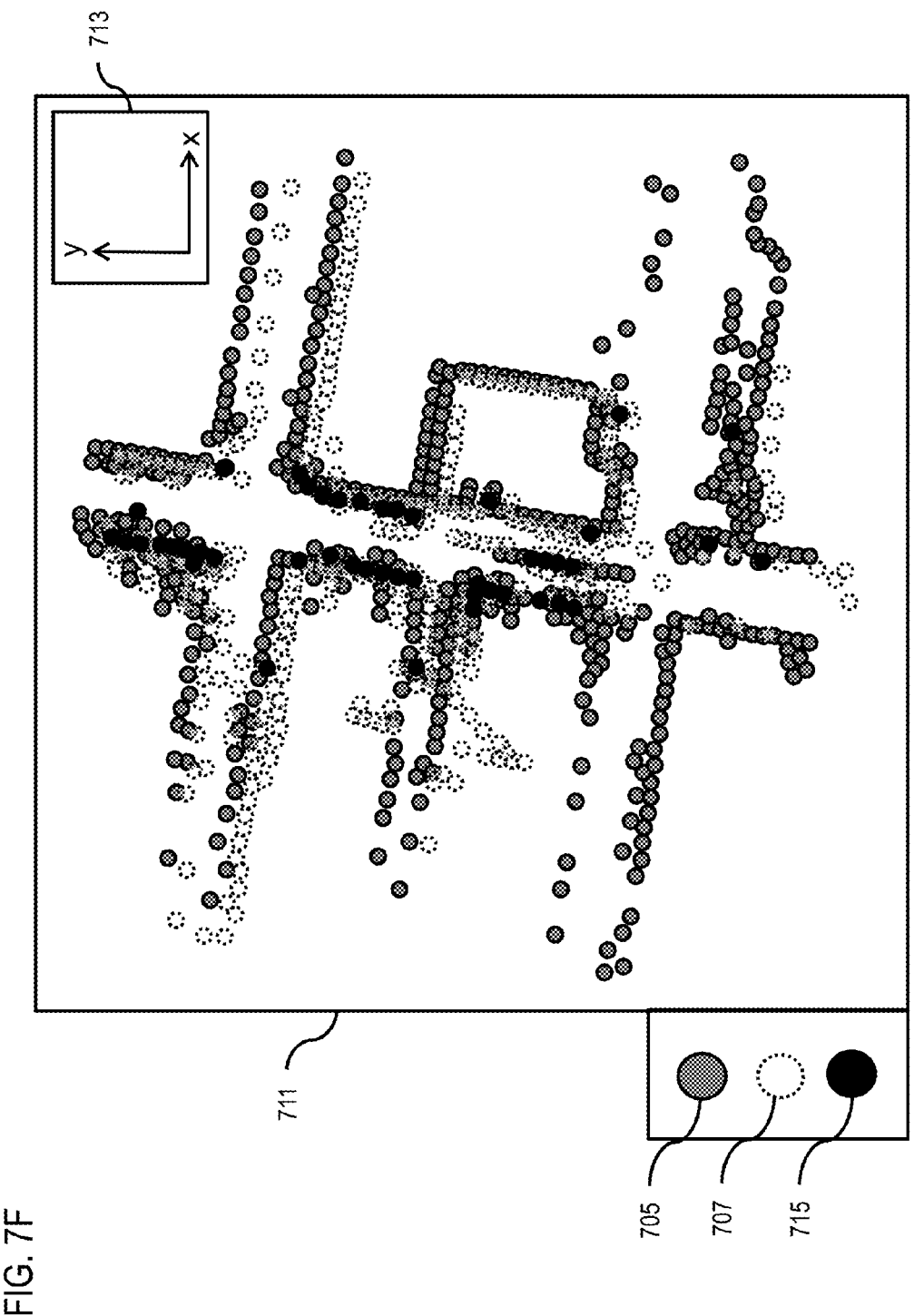
Figure 7G:
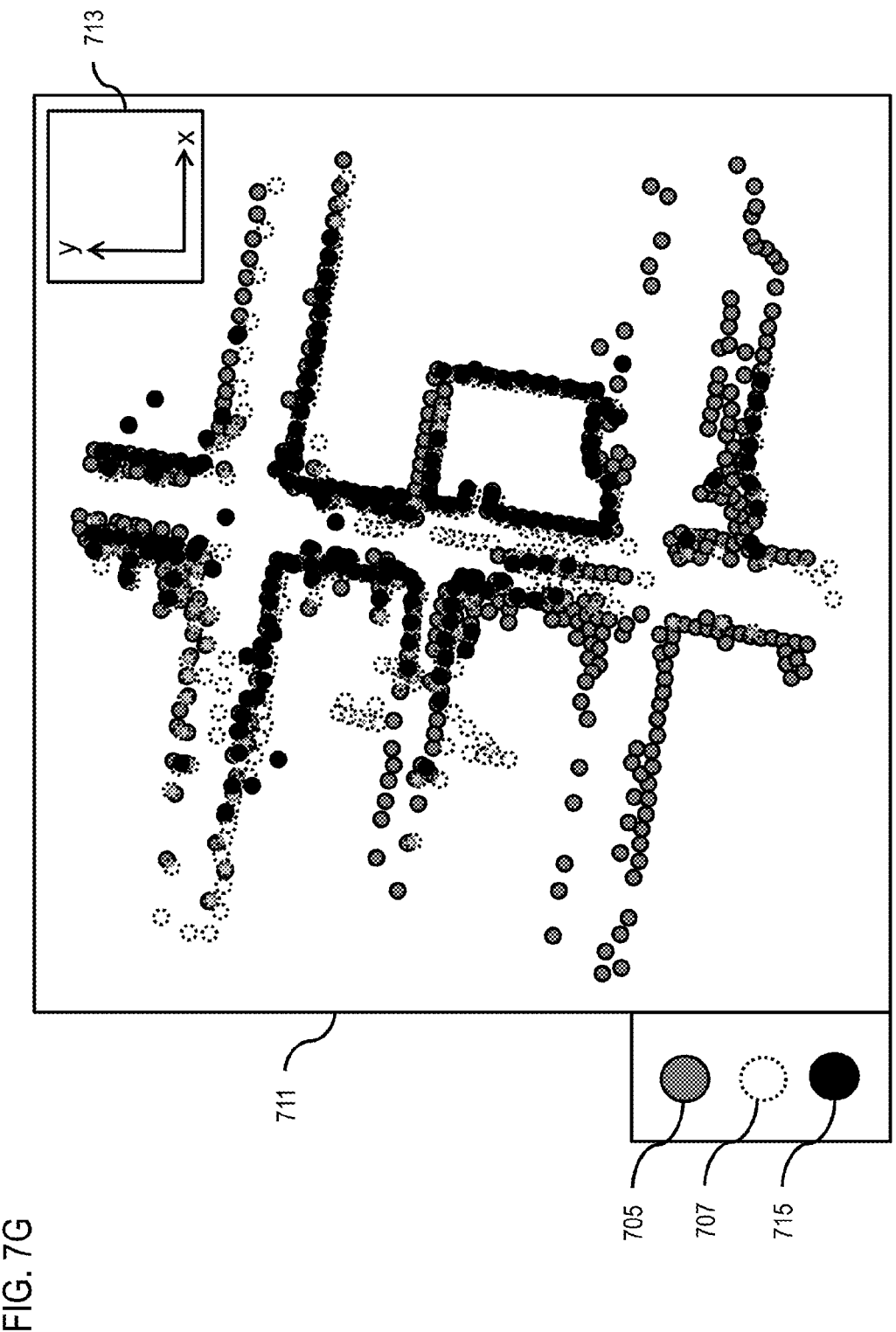

FIG. 7A shows images 701 and 703. In the image 701, two data point clouds: a first data point cloud indicated by darker color identifiers 705 and a second data point cloud indicated by lighter color identifiers 707. In one embodiment, when the two data point clouds are projected onto an image, in 701, the two data point clouds are misaligned as some of the identifiers 705 and 707 do not overlap. For example, the two data point clouds may be a LIDAR scan of a curb-side including buildings, cars, people, and the like. In one embodiment, the two data point clouds may be aligned to render the image 703 where most of the data points may be aligned as they overlap, which are indicated by the indicator 709.

FIGS. 7B through 7G include image 711 which shows two data point clouds represented by the indicators 705 and 707. In various embodiments, the processing platform 103 may use one or more algorithms for processing and aligning the two data point clouds in 2D along x and y axes 713. In one example, the data point cloud 705 may be used as a reference (e.g., kept stationary) and the second data point cloud 707 may be moving along the x and y axes 713 in order to align the two data point clouds. In one use case scenario, when data points 705 and 707 align (e.g., overlap), a different indicator 715 (e.g., a darker color, a different shape, etc.) may be utilized to indicate that the two points are aligned. It is noted that each of the two data point clouds 705 and 707 may be a portion of a larger data point cloud, wherein the algorithm may attempt to align the 705 and 707 portions of the two larger data point clouds. Additionally, as the two data point clouds are being lined, it is possible that only certain portions of the two data point clouds may be aligned. For example, it is possible that based on various parameters, thresholds, displacements, and iterations a portion of two data point clouds may not be necessarily perfectly aligned during or at the end of the alignment process. In various embodiments, displacements for use in an alignment may be dynamically adjusted. For example, a movement along the x-axis may be varied as the algorithm a switching between alignments along the x-axis and y-axis.

Figure 7H:
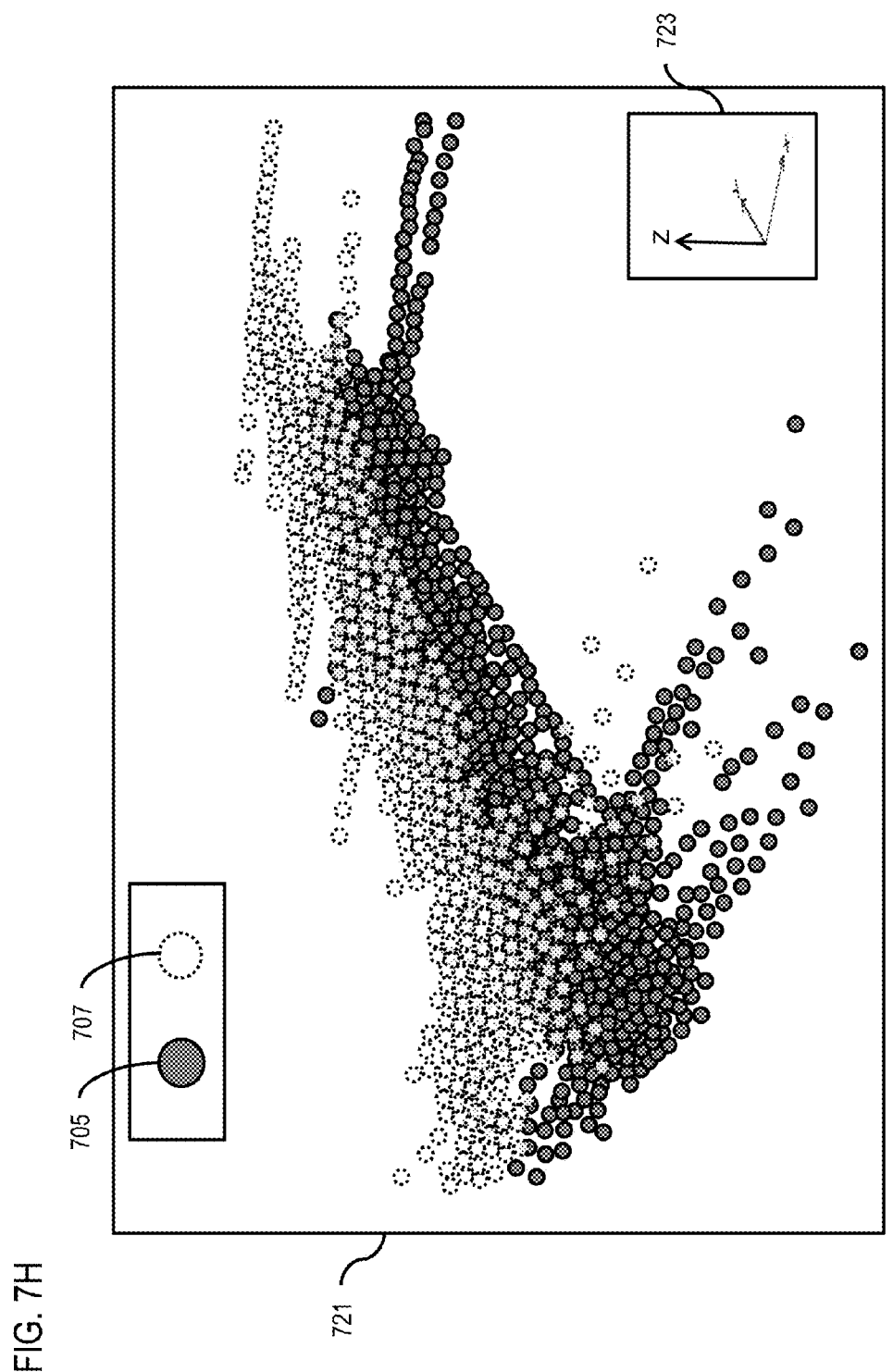

FIG. 7H shows diagram 721 which illustrates the ground surface points of the two example data point clouds 705 and 707. As discussed earlier, the alignment of a 3D data point cloud may be achieved by first extracting ground surface points in the two data point clouds and perform a 2D alignment and then align the ground surface points in a 1D alignment process. In the diagram 721 the ground surface points of the data point cloud 705 is below the ground surface points of the data point cloud 707. In one scenario, the processing platform 103 may determine a vertical offset in z-axis 723 to determine a mean value for use in the 1D alignment of the two horizontally aligned data point clouds 705 and 707.

FIG. 7I shows diagrams 731, 733, 735, and 737 illustrating depictions of the two data point clouds 705 and 707 "before" and "after" the alignment processes. In one example, the diagram 731 illustrates a 2D "before" representation of the two data point clouds 705 and 707 and the diagram 733 illustrates the 2D "before" representation projected onto a horizontal image. Further, the diagram 735 illustrates the 2D "after" representation of the two data point clouds 705 and 707 and the diagram 737 illustrates the 2D "after" representation projected onto a horizontal image. In this example, a majority of the two data point clouds 705 and 707 are shown as substantially aligned in the "after" diagrams.

It is noted, that the methods described herein may significantly improve the efficiency, accuracy, and reliability of aligning one or more portions of a plurality of data point clouds. In example embodiments, a plurality of 3D data point clouds may be segmented into 2D and 1D portions and then aligned respectively, wherein the segmentations and/or the order of the alignments (e.g., horizontal or vertical) may be flexible and determined by a user, a user configuration, one or more algorithms, available processing/capture resources, or the like. For instance, two data point clouds first may be aligned vertically and then aligned horizontally. In various embodiments, data point clouds with higher orders of dimensions (e.g., 4D, 5D, etc.), for example including time dimension or the like, may be segmented according to user and/or algorithm configurations for processing and alignments by the system 100.

The processes described herein to efficiently and accurately process and align one or more portions of a plurality of data point clouds may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
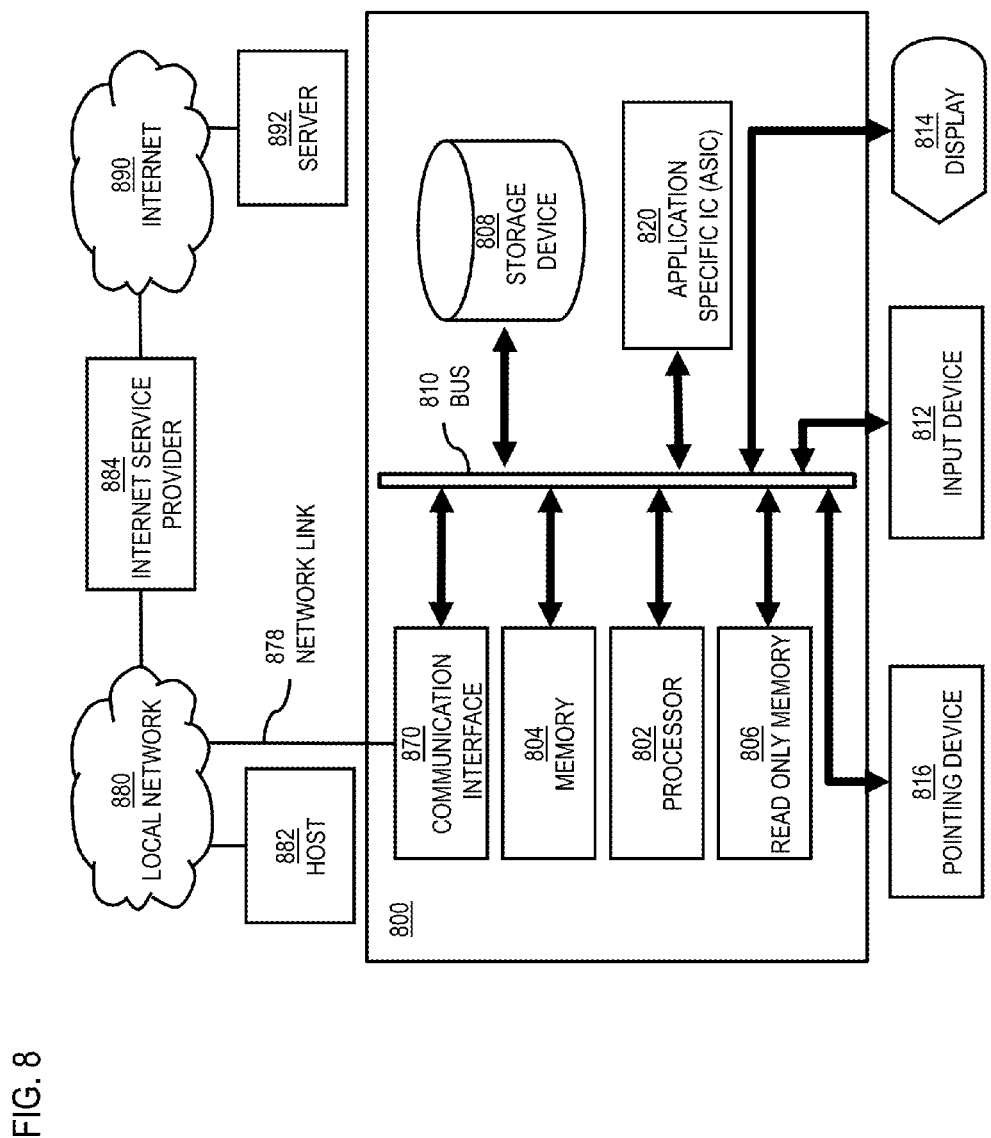
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to efficiently and accurately process and align one or more portions of a plurality of data point clouds as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of efficient and accurate processing and aligning one or more portions of a plurality of data point clouds.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to efficiently and accurately process and align one or more portions of a plurality of data point clouds. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for efficient and accurate processing and aligning one or more portions of a plurality of data point clouds. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for efficient and accurate processing and aligning one or more portions of a plurality of data point clouds, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814, and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic, or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for efficient and accurate processing and aligning one or more portions of a plurality of data point clouds.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880, and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed for efficient and accurate processing and aligning one or more portions of a plurality of data point clouds as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of efficient and accurate processing and aligning one or more portions of a plurality of data point clouds.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to efficiently and accurately process and align one or more portions of a plurality of data point clouds. The memory 905 also stores the data associated with or generated by the execution of the inventive steps.

Figure 10:
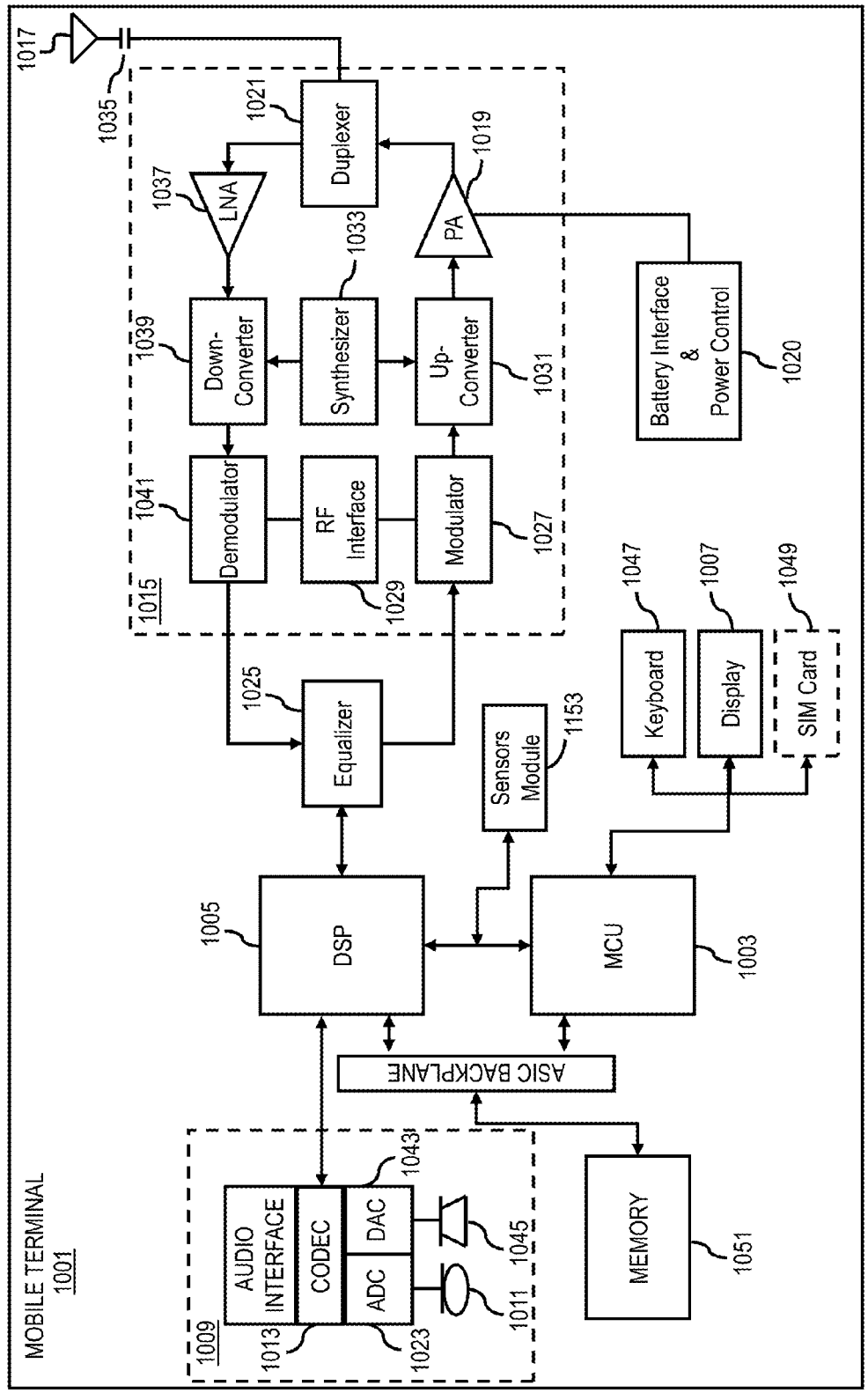
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of efficient and accurate processing and aligning one or more portions of a plurality of data point clouds. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of efficient and accurate processing and aligning one or more portions of a plurality of data point clouds. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 for efficient and accurate processing and aligning one or more portions of a plurality of data point clouds. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Additionally, sensors module 1053 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1001 (e.g., a mobile phone), a user of the mobile terminal 1001, an environment of the mobile terminal 1001 and/or the user, or a combination thereof, wherein the data may be collected, processed, stored, and/or shared with one or more components and/or modules of the mobile terminal 1001 and/or with one or more entities external to the mobile terminal 1001.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for accurate aligning of one or more portions of two or more data point clouds comprising:

receiving at a data collection server geo-location data sent over a communication network from at least one vehicle, the data collection server comprising a processor and a memory that stores the geo-location data as at least one first geo-registered point cloud and at least one second geo-registered point cloud, wherein the processor:

determines trace information for the at least one vehicle capturing the at least one first geo-registered point cloud and the at least one second geo-registered point cloud;

determines a ground surface threshold by measuring minimum elevation of LIDAR (Light Detection And Ranging) data points underneath the trace information;

segments the at least one first geo-registered point cloud and the at least one second geo-registered point cloud based on an application of the ground surface threshold to one or more respective points in the at least one first geo-registered point cloud and the at least one second geo-registered point cloud;

processes the one or more respective points that are above the ground surface threshold to determine a horizontal offset for horizontally aligning the at least one first geo-registered point cloud and the at least one second geo-registered point cloud;

processes the one or more respective points that are below the ground surface threshold to determine a vertical offset for a vertical alignment of the at least one first geo-registered point cloud and the at least one second geo-registered point cloud;

processes the vertical offset to determine a mean value based on one or more height differences between one or more minimum heights along the ground surface in the at least one first geo-registered point cloud and the ground surface in the at least one second geo-registered point cloud; and vertically aligns the horizontally aligned the at least one first geo-registered point cloud and the at least one second geo-registered point cloud based on the mean value, wherein the horizontal alignment, the vertical alignment, or a combination thereof is/are based on one or more iteration thresholds determined by a user, by an algorithm, or a combination thereof.

2. A method of claim 1, wherein the processor further:

projects the one or more respective points that are above the ground surface threshold for the at least one first geo-registered point cloud into at least one first horizontal image;

projects the one or more respective points that are above the ground surface threshold for the at least one second geo-registered point cloud into at least one second horizontal image; and determines the horizontal offset based on an alignment along two directional axes of the at least one first horizontal image and the at least one second horizontal image, wherein the two directional axes include a latitudinal axis and a longitudinal axis.

3. A method of claim 2, wherein the processor further:

determines the alignment of the at least one first horizontal image and the at least one second horizontal image based on determining a number of one or more overlapping pixels between the at least one first horizontal image and the at least one second horizontal image.

4. A method of claim 3, wherein the processor further:

determines the horizontal offset based on a distance represented by the one or more overlapping pixels.

5. A method of claim 2, wherein the horizontal alignment is based on a maximum displacement in the latitudinal axis, the longitudinal axis, or a combination thereof.

6. A method of claim 1, wherein the processor further:

determines an anticipated error in location information associated with respective points of the at least one first geo-registered point cloud and the at least one second geo-registered point cloud based on respective location information of the at least one vehicle when capturing the at least one first geo-registered point cloud and the at least one second geo-registered point cloud.

7. A method of claim 1, wherein the processor further:

determines an accuracy rate for the horizontal alignment, the vertical alignment, or a combination thereof; and adjusts to the one or more iteration thresholds based on the accuracy rate.

8. A non-transitory computer-readable storage medium carrying one or more sequences of one or more instructions stored thereon executed by a processor to perform a method for accurate aligning of one or more portions of one or more data point clouds, the method comprising: receiving geo-location data sent over a communication network from at least one vehicle;

storing the received geo-location data as at least one first geo-registered point cloud and at least one second geo-registered point cloud;

determining trace information for at least one vehicle capturing at least one first geo-registered point cloud and at least one second geo-registered point cloud;

determining a ground surface threshold by measuring minimum elevation of LIDAR (Light Detection And Ranging) data points underneath the trace information;

segmenting the at least one first geo-registered point cloud and the at least one second geo-registered point cloud based on an application of the ground surface threshold to one or more respective points in the at least one first geo-registered point cloud and the at least one second geo-registered point cloud;

processing the one or more respective points that are above the ground surface threshold to determine a horizontal offset for horizontally aligning the at least one first geo-registered point cloud and the at least one second geo-registered point cloud; and processing the one or more respective points that are below the ground surface threshold to determine a vertical offset for a vertical alignment of the at least one first geo-registered point cloud and the at least one second geo-registered point cloud;

processing the vertical offset to determine a mean value based on one or more height differences between one or more minimum heights along the ground surface in the at least one first geo-registered point cloud and the ground surface in the at least one second geo-registered point cloud; and vertically aligning the horizontally aligned the at least one first geo-registered point cloud and the at least one second geo-registered point cloud based on the mean value, wherein the horizontal alignment, the vertical alignment, or a combination thereof is/are based on one or more iteration thresholds determined by a user, by an algorithm, or a combination thereof.

9. A non-transitory computer-readable storage medium of claim 8, wherein the method further comprises:

projecting the one or more respective points that are above the ground surface threshold for the at least one first geo-registered point cloud into at least one first horizontal image;

projecting the one or more respective points that are above the ground surface threshold for the at least one second geo-registered point cloud into at least one second horizontal image; and determining the horizontal offset based on an alignment along two directional axes of the at least one first horizontal image and the at least one second horizontal image, wherein the two directional axes include a latitudinal axis and a longitudinal axis.

10. A non-transitory computer-readable storage medium of claim 9, wherein the method further comprises:

determining the alignment of the at least one first horizontal image and the at least one second horizontal image based on determining a number of one or more overlapping pixels between the at least one first horizontal image and the at least one second horizontal image.

11. A non-transitory computer-readable storage medium of claim 10, wherein the method further comprises:

determining the horizontal offset based on a distance represented by the one or more overlapping pixels.

12. A non-transitory computer-readable storage medium of claim 9, wherein the horizontal alignment is based on a maximum displacement in the latitudinal axis, the longitudinal axis, or a combination thereof.

13. A non-transitory computer-readable storage medium of claim 8, wherein the method further comprises:

determining an anticipated error in location information associated with respective points of the at least one first geo-registered point cloud and the at least one second geo-registered point cloud based on respective location information of the at least one vehicle when capturing the at least one first geo-registered point cloud and the at least one second geo-registered point cloud.

14. A non-transitory computer-readable storage medium of claim 8, wherein the method further comprises:
determining an accuracy rate for the horizontal alignment, the vertical alignment, or a combination thereof; and
adjusting the one or more iteration thresholds based on the accuracy rate.

* * * * *